United States Patent
Li et al.

(10) Patent No.: US 10,135,581 B2
(45) Date of Patent: *Nov. 20, 2018

(54) METHOD, UE AND BASESTATION FOR REPORTING/RECEIVING HARQ ACK/NACK FOR PDSCH IN DYNAMIC TDD CONFIGURATIONS

(71) Applicant: Telefonaktiebolaget LM Ericsson (publ), Stockholm (SE)

(72) Inventors: Shaohua Li, Beijing (CN); Erik Eriksson, Linköping (SE); Rui Fan, Beijing (CN); Zhiheng Guo, Beijing (CN); Jinhua Liu, Beijing (CN); Xinghua Song, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/488,638

(22) Filed: Apr. 17, 2017

(65) Prior Publication Data
US 2017/0222766 A1 Aug. 3, 2017

Related U.S. Application Data

(63) Continuation of application No. 14/780,034, filed as application No. PCT/SE2014/050423 on Apr. 5, 2014, now Pat. No. 9,642,124.

(30) Foreign Application Priority Data

Apr. 5, 2013 (WO) ................ PCT/CN2013/073770

(51) Int. Cl.
*H04L 1/18* (2006.01)
*H04L 5/00* (2006.01)
(Continued)

(52) U.S. Cl.
CPC .......... *H04L 1/1864* (2013.01); *H04L 5/0055* (2013.01); *H04L 5/14* (2013.01);
(Continued)

(58) Field of Classification Search
CPC ....... H04L 1/1864; H04L 5/0055; H04L 5/14; H04W 72/0413; H04W 72/042
See application file for complete search history.

(56) References Cited

FOREIGN PATENT DOCUMENTS

WO 2012/106840 A1 8/2012

OTHER PUBLICATIONS

PCT International Preliminary Report on Patentability for International application No. PCT/SE2014/050423; , Apr. 21, 2015.
(Continued)

*Primary Examiner* — Ronald B Abelson
(74) *Attorney, Agent, or Firm* — Baker Botts, LLP

(57) ABSTRACT

The present disclosure relates to a method used in a User Equipment (UE) for reporting Hybrid Automatic Repeat Request (HARQ) acknowledgement (ACK)/non-acknowledgement (NACK) for Physical Downlink Shared Channels (PDSCHs) in dynamic time division duplex (TDD) configurations. In the method, a plurality of PDSCHs are received in DownLink (DL) subframes associated with an UpLink (UL) subframe and indicated by a DL reference TDD configuration. The DL subframes are divided into a first subset of DL subframes and a second subset of DL subframes. The first subset of DL subframes is also indicated by an UL reference TDD configuration. A first set of Physical Uplink Control Channel (PUCCH) resource indices are assigned based on resources used in transmission of Physical Downlink Control Channels (PDCCHs) corresponding to the PDSCHs received in the DL subframes of the first subset of DL subframes. A second set of PUCCH resource indices are assigned based on resources used in transmission of
(Continued)

| UL-DL conf. | 0 | 1 | 2 | 3 | 4 | 5 | 6 | 7 | 8 | 9 |
|---|---|---|---|---|---|---|---|---|---|---|
| 0 | D | S | U | U | U | D | S | U | U | U |
| 1 | D | S | U | U | D | D | S | U | U | D |
| 2 | D | S | U | D | D | D | S | U | D | D |

PDCCHs corresponding to the PDSCHs received in the DL subframes of the second subset of DL subframes. For each of the received PDSCHs, HARQ ACK/NACK is reported by using PUCCH resources in an order of the assigned first set of PUCCH resource indices for PDSCHs received in the DL subframes of the first subset of DL subframes and in an order of the assigned second set of PUCCH resource indices for PDSCHs received in the DL subframes of the second subset of DL subframes. The present disclosure also relates to a UE and BS for respectively reporting and receiving HARQ ACK/NACK for PDSCHs in TDD configurations.

12 Claims, 25 Drawing Sheets

(51) Int. Cl.
  *H04L 5/14* (2006.01)
  *H04W 72/04* (2009.01)
(52) U.S. Cl.
  CPC ..... *H04W 72/042* (2013.01); *H04W 72/0413* (2013.01); *H04W 72/0446* (2013.01)

(56) References Cited

OTHER PUBLICATIONS

PCT Written Opinion of the International Searching Authority for International application No. PCT/SE2014/050423; Sep. 5, 2014.
International Search Report for International application No. PCT/SE2014/050423; Sep. 5, 2014.
3GPP TS 36.213 v11.2.0; Technical Specification; 3rd Generation Partnership Project; Technical Specification Group Radio Access Network; Evolved Universal Terrestrial Radio Access (E-UTRA); Physical layer procedures (Release 11); Feb. 2013.
3GPP TSG RAN WG1 Meeting #69; Prague, Czech Republic; Source: Alcatel-Lucent Shanghai Bell, Alcatel-Lucent; Title: Discussion on timing issues with dynamic TDD UL-DL configuration (R1-122510); May 21-25, 2012.
3GPP TSG RAN WG1 Meeting #72; St. Julian's, Malta; Source: CATT; Title: Corrections on TDD HARQ-ACK transmission with different UL-DL configurations on different cells (R1-130759); Jan. 28-Feb. 1, 2013.
3GPP TSG RAN WG1 Meeting #72; St. Julian's, Malta; Source: NEC Group; Title: Reconfiguration signalling and HARQ-timing for TDD eIMTA system (R1-130370); Jan. 28-Feb. 1, 2013.
3GPP TSG-RAN WG1 #72; Source: HTC; Title: on HARQ Timing Issues for TDD UL-DL Reconfiguration (R1-130310); Jan. 18-Feb. 1, 2013.
3GPP TSG RAN WG1 Meeting #72; St. Julian's, Malta; Source: ZTE; Title: HARQ timing in TDD-eIMTA (R1-130130); Jan. 28-Feb. 1, 2013.
"3rd Generation Partnership Project; Technical Specification Group Radio Access Network; Evolved Universal Terrestrial Radio Access (E-UTRA); Physical layer procedures (Release 11)," 3GPP TS 36.213 V11.1.0, 3GPP, Dec. 2012.
"3rd Generation Partnership Project; Technical Specification Group Radio Access Network; Evolved Universal Terrestrial Radio Access (E-UTRA); Physical Channels and Modulation (Release 11)," 3GPP TS 36.211 V11.1.0, 3GPP, Dec. 2012.
Ericsson, ST-Ericsson, "Signalling support for dynamic TDD," 3GPP TSG-RAN WG1 #72, 3GPP, Jan. 28, 2013.

Fig. 3
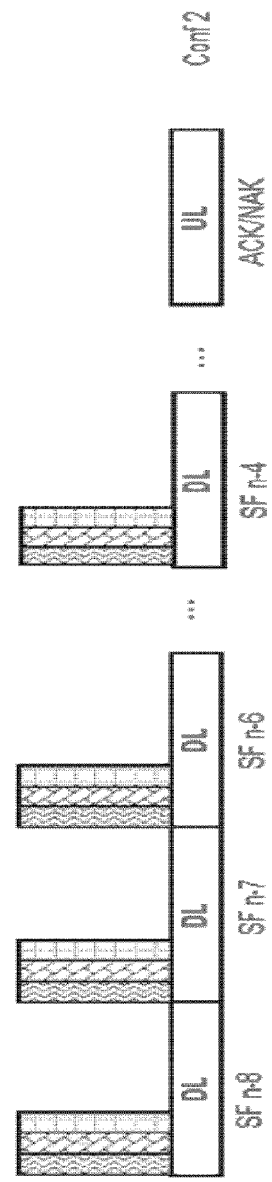
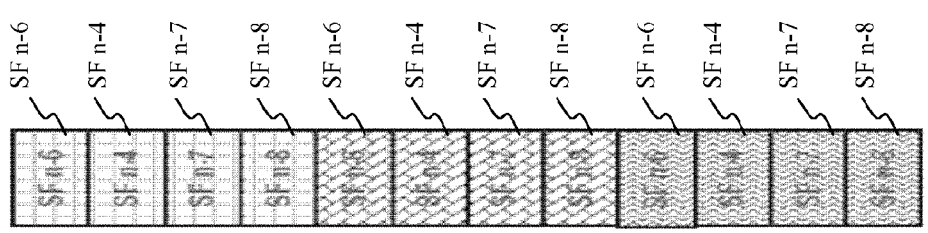

Fig. 4

| UL-DL conf. | 0 | 1 | 2 | 3 | 4 | 5 | 6 | 7 | 8 | 9 |
|---|---|---|---|---|---|---|---|---|---|---|
| 0 | D | S | U | U | U | D | S | U | U | U |
| 1 | D | S | U | U | D | D | S | U | U | D |
| 2 | D | S | U | D | D | D | S | U | D | D |

METHOD, UE AND BASESTATION FOR REPORTING/RECEIVING HARQ ACK/NACK FOR PDSCH IN DYNAMIC TDD CONFIGURATIONS

PRIORITY

This application is a continuation of U.S. application Ser. No. 14/780,034 filed on Sep. 25, 2015 entitled "Method, UE and Basestation for Reporting/Receiving HARQ ACK/NACK for PDSCH in Dynamic TDD Configurations", which is a U.S. National Stage Filing under 35 U.S.C. § 371 of International Patent Application Serial No. PCT/SE2014/050423 filed Apr. 5, 2014, and entitled "Method, UE and Basestation for Reporting/Receiving HARQ ACK/NACK For PDSCH in Dynamic TDD Configurations" which claims priority to International Patent Application Serial No. PCT/CN2013/073770 filed Apr. 5, 2013, all of which are hereby incorporated by reference in their entirety.

TECHNICAL FIELD

The technology presented in this disclosure generally relate to radio communication networks, particularly, though not exclusively, radio communication networks using Time Division Duplex (TDD), for example Long-Term Evolution (LTE) TDD. More particularly, the present disclosure relates to a method and user equipment (UE) reporting Hybrid Automatic Repeat Request (HARQ) acknowledgement (ACK)/non-acknowledgement (NACK) for Physical Downlink Shared Channel (PDSCH) in dynamic time division duplex (TDD) configurations and a method and Base Station (BS) receiving HARQ ACK/NACK for PDSCH in dynamic TDD configurations.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In a typical cellular radio system, user equipments (UEs) can communicate via a radio access network (RAN) to one or more core networks (CN). The RAN generally covers a geographical area which is divided into radio cell areas. Each radio cell area can be served by a base station, e.g., a radio base station (RBS), which in some networks may also be called, for example, a "NodeB" (UMTS) or "eNodeB" (LTE). A radio cell is a geographical area where radio coverage is generally provided by the radio base station at a base station site. Each radio cell can be identified by an identity within the local radio area, which is broadcast in the radio cell. The base stations communicate over the air interface operating on radio frequencies with the UEs within range of the base stations. In some radio access networks, several base stations may be connected, for example by landlines or microwave, to a radio network controller (RNC) or a base station controller (BSC). The radio network controller may be configured to supervise and coordinate the various activities of the plurality of base stations connected thereto. The radio network controllers may also be connected to one or more core networks.

The Universal Mobile Telecommunications System (UMTS) is a third generation mobile communication system, which evolved from the Global System for Mobile Communications (GSM). The Universal Terrestrial Radio Access Network (UTRAN) is essentially a radio access network using Wideband Code Division Multiple Access (WCDMA) for UEs. As an alternative to WCDMA, Time Division Synchronous Code Division Multiple Access (TD-SCDMA) could be used. In a standardization forum known as the Third Generation Partnership Project (3GPP), telecommunications suppliers propose and agree upon standards for third generation networks and UTRAN specifically, and investigate e.g. enhanced data rate and radio capacity. The 3GPP has undertaken to evolve the UTRAN and GSM based radio access network technologies. The first releases for the Evolved Universal Terrestrial Radio Access Network (E-UTRAN) specification have been issued. The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology where the radio base station nodes are connected to a core network, e.g., via Access Gateways (AGWs), rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has what is sometimes referred to as a "flat" architecture including radio base station nodes without reporting to radio network controller (RNC) nodes.

Transmission and reception from a node, e.g., a radio terminal like a UE in a cellular system such as LTE, can be multiplexed in the frequency domain or in the time domain, or according to combinations thereof. In Frequency Division Duplex (FDD), downlink (DL) and uplink (UL) transmission take place in different, sufficiently separated, frequency bands. In TDD, DL and UL transmission take place in different, non-overlapping time slots. Thus, TDD can operate in unpaired frequency spectrum, whereas FDD generally requires paired frequency spectrum.

Typically, a transmitted signal in a radio communication system is organized in some form of frame structure, or frame configuration. For example, LTE generally uses ten equally sized subframes 0-9 of length 1 ms per radio frame as illustrated in FIG. 1. In case of TDD as shown in FIG. 1, there is generally only a single carrier frequency, and UL and DL transmissions are separated in time. Because the same carrier frequency is used for UL and DL transmission, both the base station and the UEs need to switch from transmission to reception and vice versa. An important aspect of a TDD system is to provide a sufficiently large guard time where neither DL nor UL transmissions occur in order to avoid interference between UL and DL transmissions. For LTE, special subframes, e.g., subframe #1 and, in some cases, subframe #6 as indicated by "S" in Table 1 below, provide this guard time. A TDD special subframe is generally split into three parts: a DL part (DwPTS), a guard period (GP), and an UL part (UpPTS). The remaining subframes are either allocated to UL or DL transmission. Example UL-DL configurations, also referred to as "TDD configuration" in the present disclosure, are shown in Table 1 below where "U" indicates a subframe allocated to UL transmission and "D" indicates a subframe allocated to DL transmission. Also, exemplary special subframe configurations are shown in Table 2 below.

TABLE 1

Exemplary UL and DL configurations in TDD

| UL-DL configuration | DL-to-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

TABLE 2

Example configurations of special subframe

| Special subframe configuration | Normal cyclic prefix in DL | | | Extended cyclic prefix in DL | | |
|---|---|---|---|---|---|---|
| | | UpPTS | | | UpPTS | |
| | DwPTS | Normal cyclic prefix in UL | Extended cyclic prefix in UL | DwPTS | Normal cyclic prefix in UL | Extended cyclic prefix in UL |
| 0 | $6592 \cdot T_s$  | $2192 \cdot T_s$ | $2560 \cdot T_s$ | $7680 \cdot T_s$  | $2192 \cdot T_s$ | $2560 \cdot T_s$ |
| 1 | $19760 \cdot T_s$ |                  |                  | $20480 \cdot T_s$ |                  |                  |
| 2 | $21952 \cdot T_s$ |                  |                  | $23040 \cdot T_s$ |                  |                  |
| 3 | $24144 \cdot T_s$ |                  |                  | $25600 \cdot T_s$ |                  |                  |
| 4 | $26336 \cdot T_s$ |                  |                  | $7680 \cdot T_s$  | $4384 \cdot T_s$ | $5120 \cdot T_s$ |
| 5 | $6592 \cdot T_s$  | $4384 \cdot T_s$ | $5120 \cdot T_s$ | $20480 \cdot T_s$ |                  |                  |
| 6 | $19760 \cdot T_s$ |                  |                  | $23040 \cdot T_s$ |                  |                  |
| 7 | $21952 \cdot T_s$ |                  |                  | —                 | —                | —                |
| 8 | $24144 \cdot T_s$ |                  |                  | —                 | —                | —                |

TDD allows for different asymmetries in terms of the amount of resources allocated for UL and DL transmission, respectively, by means of different DL/UL configurations. In LTE, there are seven different configurations, see FIG. 2.

Generally speaking, to avoid significant interference between DL and UL transmissions between different radio cells, neighboring radio cells should have the same DL/UL configuration. Otherwise, UL transmission in one radio cell may interfere with DL transmission in the neighboring radio cell and vice versa. As a result, the DL/UL asymmetry generally does not vary between radio cells. The DL/UL asymmetry configuration is signaled, i.e. communicated, as part of the system information and can remain fixed for a long time.

Consequently, the TDD networks generally use a fixed frame configuration where some subframes are UL and some are DL. This may prevent or at least limit the flexibility to adopt the UL and/or DL resource asymmetry to varying radio traffic situations.

In future networks, it is envisioned that we will see more and more localized traffic, where most of the users will be in hotspots, or in indoor areas, or in residential areas. These users will be located in clusters and will produce different UL and DL traffic at different time. This essentially means that a dynamic feature to adjust the UL and DL resources to instantaneous, or near instantaneous, traffic variations would be required in future local area cells.

TDD has a potential feature where the usable band can be configured in different time slots to either UL or DL. It allows for asymmetric UL/DL allocation, which is a TDD-specific property, and not possible in FDD. There are seven different UL/DL allocations in LTE, providing 40%-90% DL resources.

In the current networks, UL/DL configuration is semi-statically configured, thus it may not match the instantaneous traffic situation. This will result in inefficient resource utilization in both UL and DL, especially in cells with a small number of users. In order to provide a more flexible TDD configuration, so-called Dynamic TDD, also sometimes referred to as Flexible TDD, has therefore been introduced. Thus, Dynamic TDD configures the TDD UL/DL asymmetry to current traffic situation in order to optimize user experience. Dynamic TDD provides the ability of a subframe to be configured as "flexible" subframe. As a result, some subframes can be configured dynamically as either for UL transmission or for DL transmission. The subframes can for example be configured as either for UL transmission or DL transmission depending on e.g. the radio traffic situation in a cell. Accordingly, Dynamic TDD can be expected to achieve promising performance improvement in TDD systems when there is a potential load imbalance between UL and DL. Besides, Dynamic TDD approach can also be utilized to reduce network energy consumption. It is expected that dynamic UL/DL allocation, referred in this section as "Dynamic TDD", should provide a good match of allocated resources to instantaneous traffic.

The UL scheduling can be indicated by Downlink Control Information (DCI) format 0 or Physical Hybrid Automatic Repeat Request (HARQ) indicator channel (PHICH) in a DL subframe, as described in Section 8 in the 3GPP Technical Specification 3GPP TS 36.213, "*Evolved Universal Terrestrial Radio Access* (E-UTRA); *Physical layer procedures*", v.11.1.0.

PUCCH HARQ-ACK resource allocation for PDSCH and ePDSCH has been specified in Rel-8 and Rel-11 respectively. For FDD a one to one mapping between the lowest Control Channel Element (CCE) index and PUCCH HARQ-ACK resource has been applied. In TDD, the challenge to PUCCH HARQ-ACK resource determination is the asymmetry between UL and DL, where there may for example be more DL subframes than UL subframes configured. This has been solved by allowing several DL subframes to be mapped to one UL subframe. The mapping of PUCCH resources for HARQ-ACK feedback in the UL subframe will then be different depending on the number of DL subframes that are mapped to the UL subframe, i e depending on the TDD configuration. For Dynamic TDD, when different UEs have different TDD configurations, resource conflicts between UEs may occur in the UL mapping of PUCCH resources for HARQ-ACK feedback. WO 2012/106840 discloses a method of dividing DL subframes into a first and second subset.

SUMMARY

It is thus an object of the present disclosure to provide an improved mechanism for mapping of resources for PUCCH HARQ-ACK feedback. This is achieved by the claimed solution according to claims 1, 4, 7 and 10.

According to a first aspect of the present disclosure, a method used in a User Equipment (UE) for reporting Hybrid Automatic Repeat Request (HARQ) acknowledgement (ACK)/non-acknowledgement (NACK) for Physical Downlink Shared Channels (PDSCHs) in dynamic time division duplex (TDD) configurations is provided. The method comprises receiving a plurality of PDSCHs in DownLink (DL) subframes associated with an UpLink (UL) subframe and indicated by a DL reference TDD configuration. The method further comprises dividing the DL subframes into a first subset of DL subframes and a second subset of DL subframes, wherein the first subset of DL subframes is also indicated by an UL reference TDD configuration. The method further comprises assigning a first set of Physical Uplink Control Channel (PUCCH) resource indices based on resources used in transmission of Physical Downlink Control Channels (PDCCHs) corresponding to the PDSCHs received in the DL subframes of the first subset of DL subframes and assigning a second set of PUCCH resource indices based on resources used in transmission of PDCCHs corresponding to the PDSCHs received in the DL subframes of the second subset of DL subframes. Then, the method comprises: for each of the received PDSCHs, reporting HARQ ACK/NACK using PUCCH resources in an order of the assigned first set of PUCCH resource indices for PDSCHs received in the DL subframes of the first subset of DL subframes and in an order of the assigned second set of PUCCH resource indices for PDSCHs received in the DL subframes of the second subset of DL subframes.

According to a second aspect of the present disclosure, a method used in a User Equipment (UE) for reporting Hybrid Automatic Repeat Request (HARQ) acknowledgement (ACK) or non-acknowledgement (NACK) for Physical Downlink Shared Channels (PDSCHs) in dynamic time division duplex (TDD) configurations is provided. The method comprises: receiving a plurality of PDSCHs in DownLink (DL) subframes associated with an UpLink (UL) subframe and indicated by a DL reference TDD configuration; and for each of the received PDSCHs, reporting HARQ ACK/NACK by at least partially using PUCCH resources indicated by Downlink Control Information (DCI) and/or Radio Resource Control (RRC) signaling.

As an example, the method further comprises: dividing the DL subframes into a first subset of DL subframes and a second subset of DL subframes, wherein the first subset of DL subframes is also indicated by an UL reference TDD configuration; assigning a set of Physical Uplink Control Channel (PUCCH) resource indices based on resources used in transmission of Physical Downlink Control Channels (PDCCHs) corresponding to the PDSCHs received in the DL subframes of the first subset of DL subframes; for each of the PDSCHs received in the DL subframes of the first subset of DL subframes, reporting HARQ ACK/NACK using PUCCH resources in an order of the assigned set of PUCCH resource indices; and for each of the PDSCHs received in the DL subframes of the second subset of DL subframes, reporting HARQ ACK/NACK using PUCCH resources indicated by DCI and/or Radio Resource Control (RRC) signaling.

According to a third aspect of the present disclosure, a method used in a User Equipment (UE) for reporting Hybrid Automatic Repeat Request (HARQ) acknowledgement (ACK) or non-acknowledgement (NACK) for Physical Downlink Shared Channels (PDSCHs) in dynamic time division duplex (TDD) configurations is provided. The method comprises: receiving a plurality of PDSCHs in DownLink (DL) subframes associated with an UpLink (UL) subframe and indicated by a DL reference TDD configuration; for each of the received PDSCHs, determining a Physical Uplink Control Channel (PUCCH) resource based on resources used in transmission of Physical Downlink Control Channels (PDCCHs) corresponding to the PDSCHs received in the corresponding DL subframe and a start position of the PUCCH resource corresponding to the DL subframe; and reporting HARQ ACK/NACK using the determined PUCCH resource.

According to a fourth aspect of the present disclosure, a method used in a User Equipment (UE) for reporting Hybrid Automatic Repeat Request (HARQ) acknowledgement (ACK) or non-acknowledgement (NACK) for Physical Downlink Shared Channels (PDSCHs) in dynamic time division duplex (TDD) configurations is provided. The method comprises: receiving a plurality of PDSCHs in DownLink (DL) subframes associated with an UpLink (UL) subframe and indicated by a DL reference TDD configuration; selecting a DL subframe of the DL subframes, to be a first DL subframe, the sequence number of the selected DL subframe being the same as that of a first DL subframe of DL subframes associated with the UL subframe but indicated by an UL reference TDD configuration; assigning Physical Uplink Control Channel (PUCCH) resource indices based on resources used in transmission of PDCCHs corresponding to the PDSCHs received in the DL subframes associated with the UL subframe and indicated by the DL reference TDD configuration, wherein the PUCCH resource indices are assigned in an order starting from the selected first DL subframe of the DL subframes associated with the UL subframe and indicated by the DL reference TDD configuration; and for each of the received PDSCHs, reporting HARQ ACK/NACK using PUCCH resources in the order of the assigned PUCCH resource indices.

According to a fifth aspect of the present disclosure, a User Equipment (UE) for reporting Hybrid Automatic Repeat Request (HARQ) acknowledgement (ACK)/non-acknowledgement (NACK) for Physical Downlink Shared Channels (PDSCHs) in dynamic time division duplex (TDD) configurations is provided. The UE comprises a receiver, a transmitter, a memory and a processor. The memory is configured to store TDD configurations. The processor is configured to control the receiver to receive a plurality of PDSCHs in DownLink (DL) subframes associated with an UpLink (UL) subframe and indicated by a DL reference TDD configuration. The processor is configured to divide the DL subframes into a first subset of DL subframes and a second subset of DL subframes, wherein the first subset of DL subframes is also indicated by an UL reference TDD configuration. The processor is configured to assign a first set of Physical Uplink Control Channel (PUCCH) resource indices based on resources used in transmission of Physical Downlink Control Channels (PDCCHs) corresponding to the PDSCHs received in the DL subframes of the first subset of DL subframes. The processor is configured to assign a second set of PUCCH resource indices based on resources used in transmission of PDCCHs corresponding to the PDSCHs received in the DL subframes of the second subset of DL subframes. The processor is configured to control the transmitter to, for each of the received PDSCHs, report HARQ ACK/NACK using PUCCH resources in an order of the assigned first set of PUCCH resource indices for PDSCHs received in the DL subframes of the first subset of DL subframes and in an order of the assigned second set of PUCCH resource indices for PDSCHs received in the DL subframes of the second subset of DL subframes.

According to a sixth aspect of the present disclosure, a UE for reporting Hybrid Automatic Repeat Request (HARQ) acknowledgement (ACK) or non-acknowledgement (NACK) for Physical Downlink Shared Channels (PDSCHs) in dynamic time division duplex (TDD) configurations is provided. The UE comprises a receiver, a transmitter, a memory and a processor. The memory is configured to store TDD configurations. The processor is configured to control the receiver to receive a plurality of PDSCHs in DownLink (DL) subframes associated with an UpLink (UL) subframe and indicated by a DL reference TDD configuration. The processor is configured to control the transmitter to, for each of the received PDSCHs, report HARQ ACK/NACK by at least partially using PUCCH resources indicated by Downlink Control Information (DCI) and/or Radio Resource Control (RRC) signaling.

According to a seventh aspect of the present disclosure, a UE for reporting Hybrid Automatic Repeat Request (HARQ) acknowledgement (ACK) or non-acknowledgement (NACK) for Physical Downlink Shared Channels (PDSCHs) in dynamic time division duplex (TDD) configurations is provided. The UE comprises a receiver, a transmitter, a memory and a processor. The memory is configured to store TDD configurations. The processor is configured to control the receiver to receive a plurality of PDSCHs in DownLink (DL) subframes associated with an UpLink (UL) subframe and indicated by a DL reference TDD configuration. The processor is configured to, for each of the received PDSCHs, determine a Physical Uplink Control Channel (PUCCH) resource based on resources used in transmission of Physical Downlink Control Channels (PDCCHs) corresponding to the PDSCHs received in the corresponding DL subframe and a start position of the PUCCH resource corresponding to the DL subframe. The processor is further configured to control the transmitter to, for each of the received PDSCHs, report HARQ ACK/NACK using the determined PUCCH resource.

According to a eighth aspect of the present disclosure, a UE for reporting Hybrid Automatic Repeat Request (HARQ) acknowledgement (ACK) or non-acknowledgement (NACK) for Physical Downlink Shared Channels (PDSCHs) in dynamic time division duplex (TDD) configurations is provided. The UE comprises a receiver, a transmitter, a memory and a processor. The memory is configured to store TDD configurations. The processor is configured to control the receiver to receive a plurality of PDSCHs in DownLink (DL) subframes associated with an UpLink (UL) subframe and indicated by a DL reference TDD configuration. The processor is configured to select a DL subframe of the DL subframes, to be a first DL subframe, the sequence number of the selected DL subframe being the same as that of a first DL subframe of DL subframes associated with the UL subframe but indicated by an UL reference TDD configuration. The processor is configured to assign Physical Uplink Control Channel (PUCCH) resource indices based on resources used in transmission of PDCCHs corresponding to the PDSCHs received in the DL subframes associated with the UL subframe and indicated by the DL reference TDD configuration, wherein the PUCCH resource indices are assigned in an order starting from the selected first DL subframe of the DL subframes associated with the UL subframe and indicated by the DL reference TDD configuration. The processor is configured to control the transmitter to, for each of the received PDSCHs, report HARQ ACK/NACK using PUCCH resources in the order of the assigned PUCCH resource indices.

According to a ninth aspect of the present disclosure, a method used in a Base Station (BS) for receiving Hybrid Automatic Repeat Request (HARQ) acknowledgement (ACK)/non-acknowledgement (NACK) for Physical Downlink Shared Channels (PDSCHs) in dynamic time division duplex (TDD) configurations is provided. The method comprises transmitting a plurality of PDSCHs in DownLink (DL) subframes associated with an UpLink (UL) subframe and indicated by a DL reference TDD configuration. The method further comprises dividing the DL subframes into a first subset of DL subframes and a second subset of DL subframes, wherein the first subset of DL subframes is also indicated by an UL reference TDD configuration. The method further comprises assigning a first set of Physical Uplink Control Channel (PUCCH) resource indices based on resources used in transmission of Physical Downlink Control Channels (PDCCHs) corresponding to the PDSCHs transmitted in the DL subframes of the first subset of DL subframes and assigning a second set of PUCCH resource indices based on resources used in transmission of PDCCHs corresponding to the PDSCHs transmitted in the DL subframes of the second subset of DL subframes. Then, the method comprises: for each of the transmitted PDSCHs, receiving HARQ ACK/NACK on PUCCH resources in an order of the assigned first set of PUCCH resource indices for PDSCHs transmitted in the DL subframes of the first subset of DL subframes and in an order of the assigned second set of PUCCH resource indices for PDSCHs transmitted in the DL subframes of the second subset of DL subframes.

According to a tenth aspect of the present disclosure, a method used in a Base Station (BS) for receiving Hybrid Automatic Repeat Request (HARQ) acknowledgement (ACK) or non-acknowledgement (NACK) for Physical Downlink Shared Channels (PDSCHs) in dynamic time division duplex (TDD) configurations is provided. The method comprises: transmitting a plurality of PDSCHs in DownLink (DL) subframes associated with an UpLink (UL) subframe and indicated by a DL reference TDD configuration; and for each of the transmitted PDSCHs, receiving HARQ ACK/NACK at least partially on PUCCH resources indicated by Downlink Control Information (DCI) and/or Radio Resource Control (RRC) signaling.

As an example, the method further comprises: dividing the DL subframes into a first subset of DL subframes and a second subset of DL subframes, wherein the first subset of DL subframes is also indicated by an UL reference TDD configuration; assigning a set of Physical Uplink Control Channel (PUCCH) resource indices based on resources used in transmission of Physical Downlink Control Channels (PDCCHs) corresponding to the PDSCHs transmitted in the DL subframes of the first subset of DL subframes; for each of the PDSCHs transmitted in the DL subframes of the first subset of DL subframes, receiving HARQ ACK/NACK on PUCCH resources in an order of the assigned set of PUCCH resource indices; and for each of the PDSCHs transmitted in the DL subframes of the second subset of DL subframes, receiving HARQ ACK/NACK on PUCCH resources indicated by DCI and/or RRC signaling.

According to a eleventh aspect of the present disclosure, a method used in a Base Station (BS) for receiving Hybrid Automatic Repeat Request (HARQ) acknowledgement (ACK) or non-acknowledgement (NACK) for Physical Downlink Shared Channels (PDSCHs) in dynamic time division duplex (TDD) configurations is provided. The method comprises: transmitting a plurality of PDSCHs in DownLink (DL) subframes associated with an UpLink (UL) subframe and indicated by a DL reference TDD configuration; for each of the transmitted PDSCHs, determining a Physical Uplink Control Channel (PUCCH) resource based on resources used in transmission of Physical Downlink Control Channels (PDCCHs) corresponding to the PDSCHs transmitted in the corresponding DL subframe and a start position of the PUCCH resource corresponding to the DL subframe; and, for each of the transmitted PDSCHs, receiving HARQ ACK/NACK on the determined PUCCH resource.

According to a twelfth aspect of the present disclosure, a method used in a Base Station (BS) for receiving Hybrid Automatic Repeat Request (HARQ) acknowledgement (ACK) or non-acknowledgement (NACK) for Physical Downlink Shared Channels (PDSCHs) in dynamic time division duplex (TDD) configurations is provided. The method comprises: transmitting a plurality of PDSCHs in DownLink (DL) subframes associated with an UpLink (UL) subframe and indicated by a DL reference TDD configuration; selecting a DL subframe of the DL subframes, to be a first DL subframe, the sequence number of the selected DL subframe being the same as that of a first DL subframe of DL subframes associated with the UL subframe but indicated by an UL reference TDD configuration; assigning Physical Uplink Control Channel (PUCCH) resource indices based on resources used in transmission of PDCCHs corresponding to the PDSCHs transmitted in the DL subframes associated with the UL subframe and indicated by the DL reference TDD configuration, wherein the PUCCH resource indices are assigned in an order starting from the selected first DL subframe of the DL subframes associated with the UL subframe and indicated by the DL reference TDD configuration; and for each of the transmitted PDSCHs, receiving HARQ ACK/NACK on PUCCH resources in the order of the assigned PUCCH resource indices.

According to a thirteenth aspect of the present disclosure, a Base Station (BS) for receiving Hybrid Automatic Repeat Request (HARQ) acknowledgement (ACK)/non-acknowledgement (NACK) for Physical Downlink Shared Channels (PDSCHs) in dynamic time division duplex (TDD) configurations is provided. The BS comprises a receiver, a transmitter, a memory and a processor. The memory is configured to store TDD configurations. The processor is configured to control the transmitter to transmit a plurality of PDSCHs in DownLink (DL) subframes associated with an UpLink (UL) subframe and indicated by a DL reference TDD configuration. The processor is configured to divide the DL subframes into a first subset of DL subframes and a second subset of DL subframes, wherein the first subset of DL subframes is also indicated by an UL reference TDD configuration. The processor is configured to assign a first set of Physical Uplink Control Channel (PUCCH) resource indices based on resources used in transmission of Physical Downlink Control Channels (PDCCHs) corresponding to the PDSCHs transmitted in the DL subframes of the first subset of DL subframes. The processor is configured to assign a second set of PUCCH resource indices based on resources used in transmission of PDCCHs corresponding to the PDSCHs transmitted in the DL subframes of the second subset of DL subframes. The processor is configured to control the receiver to, for each of the transmitted PDSCHs, receive HARQ ACK/NACK on PUCCH resources in an order of the assigned first set of PUCCH resource indices for PDSCHs transmitted in the DL subframes of the first subset of DL subframes and in an order of the assigned second set of PUCCH resource indices for PDSCHs transmitted in the DL subframes of the second subset of DL subframes.

According to a fourteenth aspect of the present disclosure, a Base Station (BS) for receiving Hybrid Automatic Repeat Request (HARQ) acknowledgement (ACK) or non-acknowledgement (NACK) for Physical Downlink Shared Channels (PDSCHs) in dynamic time division duplex (TDD) configurations is provided. The BS comprises a receiver, a transmitter, a memory and a processor. The memory is configured to store TDD configurations. The processor is configured to control the transmitter to transmit a plurality of PDSCHs in DownLink (DL) subframes associated with an UpLink (UL) subframe and indicated by a DL reference TDD configuration. The processor is configured to control the receiver to, for each of the transmitted PDSCHs, receive HARQ ACK/NACK at least partially on PUCCH resources indicated by Downlink Control Information (DCI) and/or Radio Resource Control (RRC) signaling.

According to a fifteenth aspect of the present disclosure, a Base Station (BS) for receiving Hybrid Automatic Repeat Request (HARQ) acknowledgement (ACK) or non-acknowledgement (NACK) for Physical Downlink Shared Channels (PDSCHs) in dynamic time division duplex (TDD) configurations is provided. The BS comprises a receiver, a transmitter, a memory and a processor. The memory is configured to store TDD configurations. The processor is configured to control the transmitter to transmit a plurality of PDSCHs in DownLink (DL) subframes associated with an UpLink (UL) subframe and indicated by a DL reference TDD configuration. The processor is configured to, for each of the transmitted PDSCHs, determine a Physical Uplink Control Channel (PUCCH) resource based on resources used in transmission of Physical Downlink Control Channels (PDCCHs) corresponding to the PDSCHs transmitted in the corresponding DL subframe and a start position of the PUCCH resource corresponding to the DL subframe. The processor is further configured to control the receiver to, for each of the transmitted PDSCHs, receive HARQ ACK/NACK on the determined PUCCH resource.

According to a sixteenth aspect of the present disclosure, a Base Station (BS) for receiving Hybrid Automatic Repeat Request (HARQ) acknowledgement (ACK) or non-acknowledgement (NACK) for Physical Downlink Shared Channels (PDSCHs) in dynamic time division duplex (TDD) configurations is provided. The BS comprises a receiver, a transmitter, a memory and a processor. The memory is configured to store TDD configurations. The processor is configured to control the transmitter to transmit a plurality of PDSCHs in DownLink (DL) subframes associated with an UpLink (UL) subframe and indicated by a DL reference TDD configuration. The processor is configured to select a DL subframe of the DL subframes, to be a first DL subframe, the sequence number of the selected DL subframe being the same as that of a first DL subframe of DL subframes associated with the UL subframe but indicated by an UL reference TDD configuration. The processor is configured to assign Physical Uplink Control Channel (PUCCH) resource indices based on resources used in transmission of PDCCHs corresponding to the PDSCHs transmitted in the DL subframes associated with the UL subframe and indicated by the DL reference TDD configuration, wherein the PUCCH resource indices are assigned in an order starting from the selected first DL subframe of the DL subframes associated with the UL subframe and indicated by the DL reference TDD configuration. The processor is configured to control the receiver to, for each of the transmitted PDSCHs, receive HARQ ACK/NACK on PUCCH resources in the order of the assigned PUCCH resource indices.

By dividing the DL subframes into a first subset of DL subframes and a second subset of DL subframes so that the first subset of DL subframes is also indicated by an UL reference TDD configuration and reporting (UE) or receiving (BS) HARQ ACK/NACK using PUCCH resources in an order of the assigned first set of PUCCH resource indices for PDSCHs received (UE) or transmitted (BS) in the DL subframes of the first subset of DL subframes according to at least the first, fifth, ninth and thirteenth aspects of the present disclosure, the above stated object is achieved in that conflicts in the UL mapping of PUCCH resources for HARQ feedback between legacy UEs and dynamic-TDD-enabled UEs are avoided, so that the HARQ ACK/NACK transmissions from the legacy UEs and the dynamic-TDD-enabled UEs can be properly received at the base station.

Furthermore, by also reporting (UE) or receiving (BS) HARQ ACK/NACK using PUCCH resources in an order of the assigned second set of PUCCH resource indices for PDSCHs received (UE) or transmitted (BS) in the DL subframes of the second subset of DL subframes according to at least the first, fifth, ninth and thirteenth aspects of the present disclosure, the above stated object is achieved in that conflicts in the UL mapping of PUCCH resources for HARQ feedback between dynamic-TDD-enabled UEs having different TDD configurations are avoided, so that the HARQ ACK/NACK transmissions from the dynamic-TDD-enabled UEs can be properly received at the base station.

The above stated object is further achieved according to the second, sixth, tenth and fourteenth aspects of the present disclosure by at least partially using PUCCH resources indicated by Downlink Control Information (DCI) and/or Radio Resource Control (RRC) signaling for reporting (UE) or receiving (BS) HARQ ACK/NACK feedback for PDSCHs received (UE) or transmitted (BS) in DL subframes associated with an UL subframe and indicated by a DL reference TDD configuration, so that dynamic-TDD-enabled UEs having different TDD configurations are informed by the network, e g the BS, of what PUCCH resources to use for HARQ feedback, thereby avoiding conflicts in the UL mapping of PUCCH resources for HARQ feedback, so that the HARQ ACK/NACK transmissions from the dynamic-TDD-enabled UEs can be properly received at the base station.

The above stated object is further achieved according to the third, seventh, eleventh and fifteenth aspects of the present disclosure by reporting (UE) or receiving (BS) HARQ ACK/NACK feedback, for PDSCHs received (UE) or transmitted (BS) in DL subframes associated with an UL subframe and indicated by a DL reference TDD configuration, using PUCCH resources determined based on resources used in transmission of PDCCHs corresponding to the PDSCHs received (UE) or transmitted (BS) in the corresponding DL subframe and a start position of the PUCCH resource corresponding to the DL subframe, so that dynamic-TDD-enabled UEs having different TDD configurations are able to determine what PUCCH resources to use for HARQ feedback in a uniform way, whereby conflicts in the UL mapping of PUCCH resources for HARQ feedback are avoided, so that the HARQ ACK/NACK transmissions from the dynamic-TDD-enabled UEs can be properly received at the base station.

The above stated object is further achieved according to the fourth, eighth, twelfth and sixteenth aspects of the present disclosure by selecting a first DL subframe associated with the UL subframe and indicated by its sequence number in the DL reference TDD configuration as well as in the UL reference TDD configuration and reporting (UE) or receiving (BS) HARQ ACK/NACK feedback, for PDSCHs received (UE) or transmitted (BS) in DL subframes associated with the UL subframe and indicated by the DL reference TDD configuration, using PUCCH resources in an order indicated by PUCCH resource indices that are assigned based on resources used in transmission of PDCCHs corresponding to the PDSCHs received (UE) or transmitted (BS) in the DL subframes in an order starting from the selected first DL subframe, so that dynamic-TDD-enabled UEs having different TDD configurations are able to determine what PUCCH resources to use for HARQ feedback in a uniform way. Because the PUCCH resource indices are assigned in an order starting from the selected first DL subframe, the order is also compatible with the UL mapping of PUCCH resources for HARQ feedback applied by legacy UEs, whereby conflicts in the UL mapping of PUCCH resources for HARQ feedback are avoided, so that the HARQ ACK/NACK transmissions from the dynamic-TDD-enabled UEs as well as from legacy UEs can be properly received at the base station.

It is further an advantage of embodiments presented herein that while HARQ feedback from dynamic-TDD-enabled UEs as well as legacy UEs can be properly handled in environments where the TDD configuration of DL and UL subframes may vary dynamically in time and between UEs, the solutions of presented embodiments also allow for efficiently compressing PUCCH HARQ ACK/NACK resources so that resource utilization efficiency may be improved.

BRIEF DESCRIPTION OF THE DRAWINGS

The above and other objects, features and advantages of the present invention will be clearer from the following detailed description about the non-limited embodiments of the present invention taken in conjunction with the accompanied drawings, in which:

FIG. 3 illustrates an example TDD PUCCH HARQ-ACK resource allocation according to the prior art;

FIG. 4 shows example UL-DL configurations where UL-DL configuration 0 is taken as the UL reference TDD configuration;

Throughout the drawings, the same or similar elements or steps are identified by the same or similar reference signs.

DETAILED DESCRIPTION OF EMBODIMENTS

Figure 1:
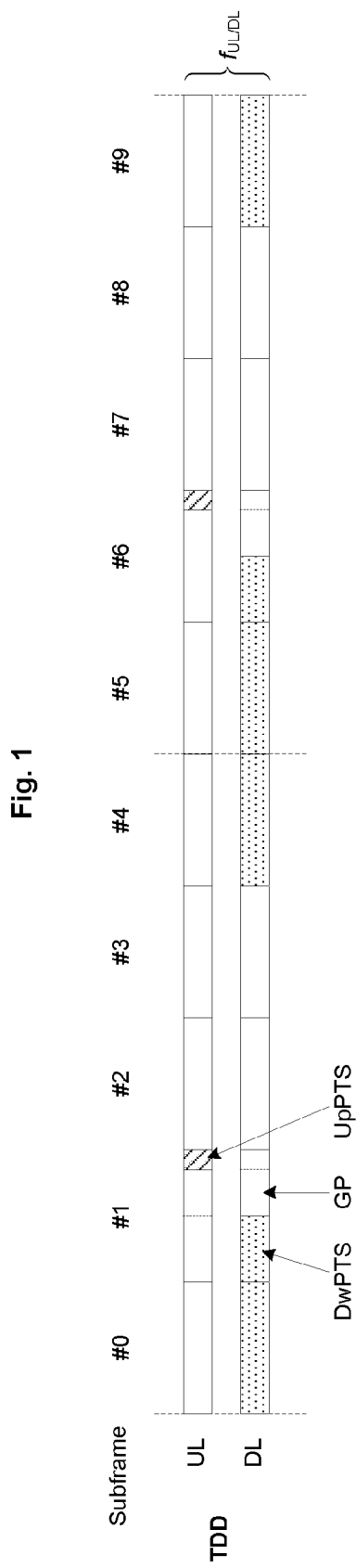
FIG. 1 illustrates uplink/downlink time/frequency structure for LTE TDD.

In the following, embodiments of the present invention will be described in accordance with the drawings. In the following description, some particular embodiments are used for the purpose of description only, which shall not be understood as any limitation to the present invention but merely examples thereof. While it may blur the understanding of the present invention, the conventional structure or construction will be omitted.

PUCCH HARQ-ACK resource allocation for PDSCH and ePDSCH has been specified in Rel-8 and Rel-11 respectively. However, PUCCH HARQ-ACK resource allocation when dynamic TDD is configured requires resource conflictions for different UEs who have different TDD configurations to be resolved if the current available PUCCH HARQ-ACK resource allocation schemes are to be used.

In TDD, the challenge to PUCCH HARQ-ACK resource determination is the asymmetry between UL and DL. When there are more DL subframes than UL subframes, the one to one mapping between the lowest CCE index and PUCCH HARQ-ACK resource in FDD cannot be reused any more, since the PUCCH resources will collide with each other across different DL subframes. On the other hand, the HARQ-ACK resource utilization should be considered since the resources for PUSCH transmission will be reduced if excessive UL resources are reserved for PUCCH HARQ-ACK transmission. The TDD PUCCH resource for HARQ-ACK transmission in response to legacy PDCCH has been specified in Section 8 in the 3GPP Technical Specification 3GPP TS 36.213, "Evolved Universal Terrestrial Radio Access (E-UTRA); Physical layer procedures", v.11.1.0.

To give a detailed description for PUCCH resource for PDCCH, FIG. 3 shows an example with four DL subframes and one UL subframe, which corresponds to TDD UL-DL configuration 2. The resource determination for HARQ-ACK multiplexing and HARQ-ACK bundling are similar and can be derived from Section 8 in the 3GPP Technical Specification 3GPP TS 36.213, "Evolved Universal Terrestrial Radio Access (E-UTRA); Physical layer procedures", v.11.1.0. It can be seen that the PUCCH HARQ-ACK resources will be stacked firstly for the lowest CCE index of the DCI belonging to the first one-third CCEs of the control region (marked with ripples) across multiple subframes, denoted SF n-8, SF n-7, SF n-6 and SF n-4 in FIG. 3, followed by the DCIs belonging to second one-third CCEs (marked with inclined grids) and finally the last one-third CCEs (marked with panes). The design philosophy is that when the system load is low, the control region could be automatically reduced by the dynamic signaling of PCFICH, hence the PUCCH HARQ-ACK resource could be compressed to a continuous region.

When dynamic TDD is configured, in general, there are two UL-DL reference TDD configurations, one for UL and one for DL, as described in R1-130588, "Signaling Support for Dynamic TDD, Ericsson, ST-Ericsson. The UL reference TDD configuration is broadcasted in System Information Block 1 (SIB1) and will be used for legacy UEs. It can also be used for Dynamic-TDD-enabled UEs for initial access. Based on the two reference TDD configurations, some subframes may be used as flexible subframes where either DL or UL can be configured. When DL is configured in some flexible subframes, the DL reference TDD configuration will be assumed for HARQ-ACK timing.

FIG. 4 shows an example where UL-DL configuration 0 is taken as the UL reference TDD configuration. In case subframe 4 and subframe 9 are used as the flexible subframes, and they are configured as DL subframes, the DL reference TDD configuration is TDD configuration 1. Similarly, if subframe 3, 4, 8 and 9 are used as flexible subframes and are configured as DL subframe, the DL reference TDD configuration is TDD configuration 2.

In TDD, each UL subframe is associated with a set of DL subframes. The HARQ-ACK in response to DL transmissions in these subframes shall be transmitted in the associated UL subframe. The DL association set is defined as in Table 3, referring to Section 8 in the 3GPP Technical Specification 3GPP TS 36.213, "Evolved Universal Terrestrial Radio Access (E-UTRA); Physical layer procedures", v.11.1.0.

TABLE 3

DL association set index K: $\{k_0, k_1, \ldots k_{M-1}\}$ for TDD

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In case dynamic TDD is configured, some UEs, e.g., legacy UEs, will use the UL reference TDD configuration for both UL and DL transmissions, whereas Dynamic-TDD-enabled UEs will use the UL reference TDD configuration for UL transmission and use the DL reference TDD configuration for DL transmissions. As a result, for legacy UEs, the PUCCH HARQ-ACK resource allocation is based on the UL reference TDD configuration; and for Dynamic-TDD-enabled UEs, the PUCCH HARQ-ACK resource allocation is based on DL reference TDD configuration. When the HARQ-ACK feedbacks occur in the same UL subframe, there will be PUCCH HARQ-ACK collisions between the legacy UEs and Dynamic-TDD-enabled UEs.

Figure 5:
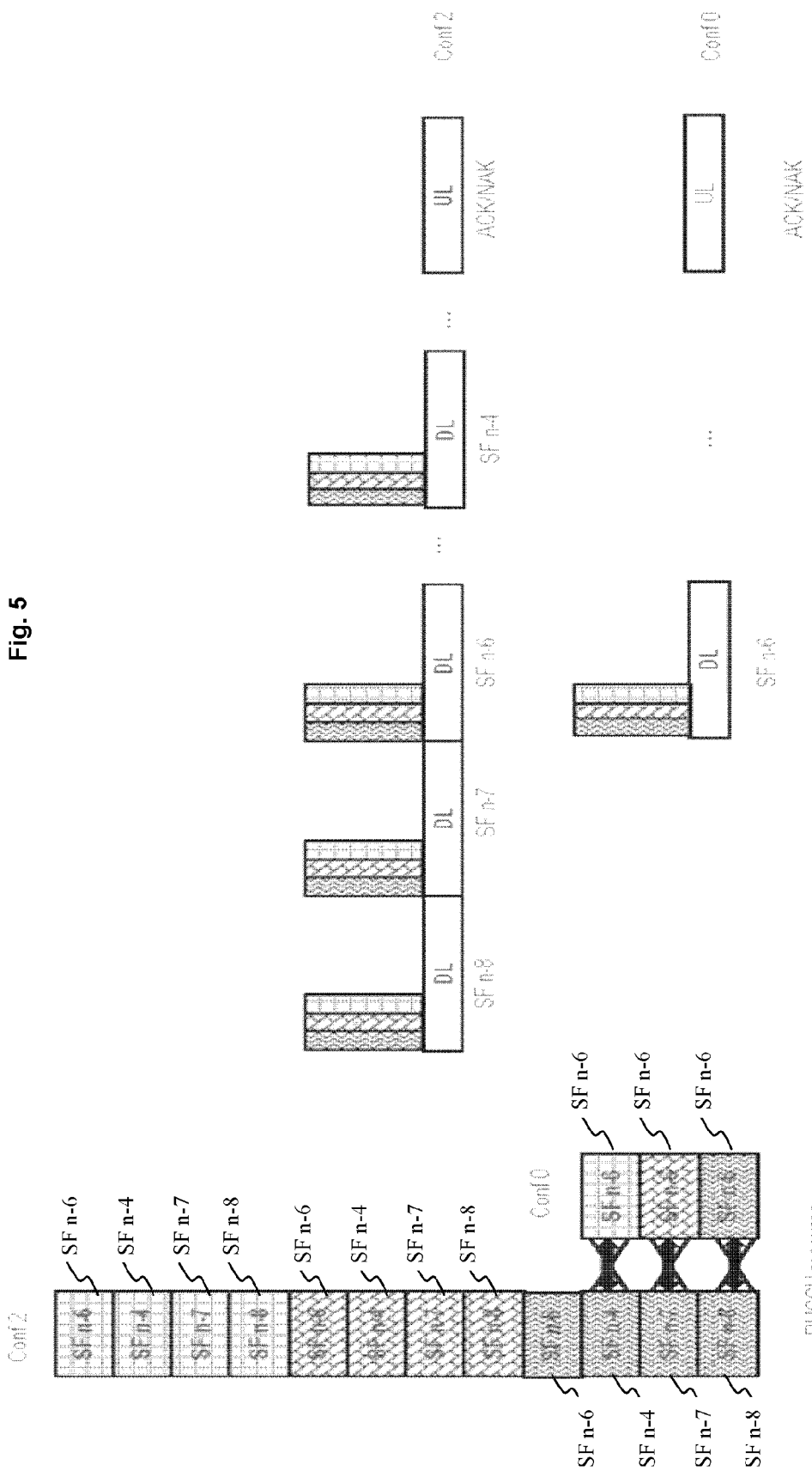
FIG. 5 shows example PUCCH HARQ-ACK resource allocations.

FIG. 5 shows example PUCCH HARQ-ACK resource allocations when the UL reference TDD configuration is TDD configuration 0 and DL reference configuration is TDD configuration 2. For subframe 2, in configuration 0, there is one associated DL subframe n-6 (subframe 6), and in configuration 2, there are four associated DL subframes n-8, n-7, n-4, and n-6 (corresponding to subframe 4, 5, 8 and 6). As shown in FIG. 5, PUCCH HARQ-ACK resource allocations for Configuration 0 are depicted in the right and the PUCCH HARQ-ACK resource allocations for Configuration 2 are depicted in the left. For the PUCCH resource allocation, it can seen that when the first one-third CCEs of subframe n-6 (i.e., the portion marked with ripples of SF n-6) are allocated for the legacy UE, and the first one-third CCEs of subframe n-8 (i.e., the portion marked with ripples of SF n-8) are allocated for the Dynamic-TDD-enabled UEs, the PUCCH HARQ-ACK resources will collide with each other. In case of conflict, i e if collision happens, HARQ-ACK transmission cannot be properly received at the eNB.

Therefore, embodiments of the invention are provided to solve the above technical problems.

First Embodiment

As the first embodiment of the invention, a method used in a UE for reporting HARQ ACK/NACK for PDSCH in dynamic TDD configurations is proposed.

Figure 6:
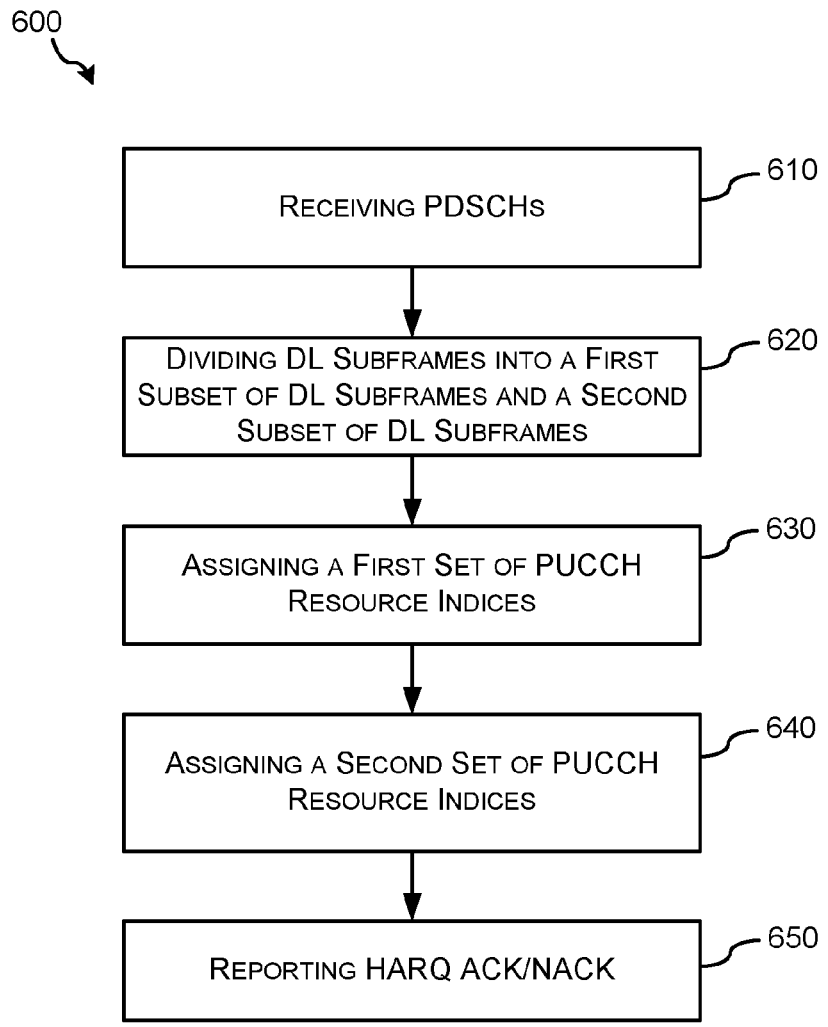
FIG. 6 shows a flowchart of a method used in UE for reporting HARQ ACK/NAK for PDSCH in dynamic TDD configurations according to a first embodiment of the present invention.

In the method, referring to FIG. 6 which shows a flowchart of the method 600, a plurality of PDSCHs are received in DL subframes associated with an UL subframe and indicated by a DL reference TDD configuration (Step 610). The DL subframes are divided into a first subset of DL subframes and a second subset of DL subframes (Step 620). The first subset of DL subframes is also indicated by an UL reference TDD configuration. Hereinafter, DL subframes associated with the UL subframe and indicated by a UL reference TDD configuration may be referred to as the first DL association subframes of the UL subframe, and DL subframes associated with a UL subframe and indicated by a DL reference TDD configuration may be referred to as the second DL association subframes of the UL subframe. Thus, the first subset of DL subframes and the second subset of DL subframes may be referred to as the first DL association subset and the second DL association subset, respectively. Then, a first set of PUCCH resource indices are assigned based on resources used in transmission of PDCCHs corresponding to the PDSCHs received in the DL subframes of the first subset of DL subframes (Step 630), and a second set of PUCCH resource indices are assigned based on resources used in transmission of PDCCHs corresponding to the PDSCHs received in the DL subframes of the second subset of DL subframes (Step 640). Thereafter, for each of the received PDSCHs, HARQ ACK/NACK is reported by using PUCCH resources in an order of the assigned first set of PUCCH resource indices for PDSCHs received in the DL subframes of the first subset of DL subframes and in an order of the assigned second set of PUCCH resource indices for PDSCHs received in the DL subframes of the second subset of DL subframes (Step 650).

In the present disclosure, there is an offset between the first set of PUCCH resource indices and the second set of PUCCH resource indices. The offset herein may be configured by higher layers or predefined. For example, the offset may be notified by the eNB via RRC signaling or Medium Access Control (MAC) Control Element (CE).

In the present disclosure, the first set of PUCCH resource indices and the second set of PUCCH resource indices may have different start positions, which may be referred to as start positions of PUCCH resources. There are four alternatives for configuring respective start positions:

As a first alternative, the eNB may broadcast respective start positions.

As a second alternative, the eNB may notify a UE of the offset for the second DL association subset via RRC signaling or MAC CE once the UE is to be scheduled for DL data transmission in any flexible subframes;

As a third alternative, the eNB may broadcast offset(s) to indicate the start position difference between different subsets of DL subframes, i.e., the start position difference between different sets of PUCCH resource indices, so that the UE can determine the PUCCH resources for the second DL association subset based on the offset and start position of the UL reference TDD configuration.

As a fourth alternative, the eNB may broadcast a start position of the UL reference TDD configuration. The UE determines the PUCCH resources for the first DL association subset according to the received start position and determines the PUCCH resources for the second DL association subset proportionally according to the amount of the feedback of the two DL association subsets. In such case, the PUCCH resource start position for the second DL association set is just next to the end position for the first DL association subset.

As a fifth alternative, the eNB may broadcast start position of the UL reference TDD configuration and the maximum size of PUCCH resources for the UL reference TDD configuration. Similar to the fourth alternative, the PUCCH resource start position for the second DL association set is next to the end position for the first DL association subset.

other one of the first and second subsets of DL subframes. The offset may be configured by higher layers.

In some embodiments of the present disclosure, the second subset of DL subframes may comprise all the DL subframes indicated by the DL reference TDD configuration other than DL subframes of the first subset of DL subframes.

In some embodiments of the present disclosure, the first subset of DL subframes may comprise one or more virtual subframes that are added by the UE, and the one or more virtual subframes may be used only for assigning PUCCH resource indices, but not for real PDSCH transmissions.

In the following, some examples will be explained in detail by assuming that the UL reference TDD configuration is TDD configuration 0 or TDD configuration 1 or TDD configuration 6, and the DL reference TDD configuration is TDD configuration 1 or TDD configuration 2. In these examples, the subframes #3, #4, #8 and #9 are flexible subframes that can be allocated as UL and DL subframes.

Example 1—TDD Configuration 1 (UL), TDD Configuration 2 (DL)

In this example, for UL subframe 2, the first DL association subset can be {7, 6}, and the second DL association subset can be {8, 4}. An example DL association subset is shown in Table 4.

TABLE 4

Example DL association set index K: $\{k_0^{(q)}, \ldots, k_{M_q-1}^{(q)}\}$ for TDD when UL reference TDD configuration is configuration 1 and DL reference TDD configuration is 2

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 1 | — | — | {7, 6} | — | 4 | — | — | {7, 6} | — | 4 |
| 2 | — | — | Subset 1: {7, 6} Subset 2: {8, 4} | — | — | — | — | Subset 1: {7, 6} Subset 2: {8, 4} | — | — |

Figure 7:
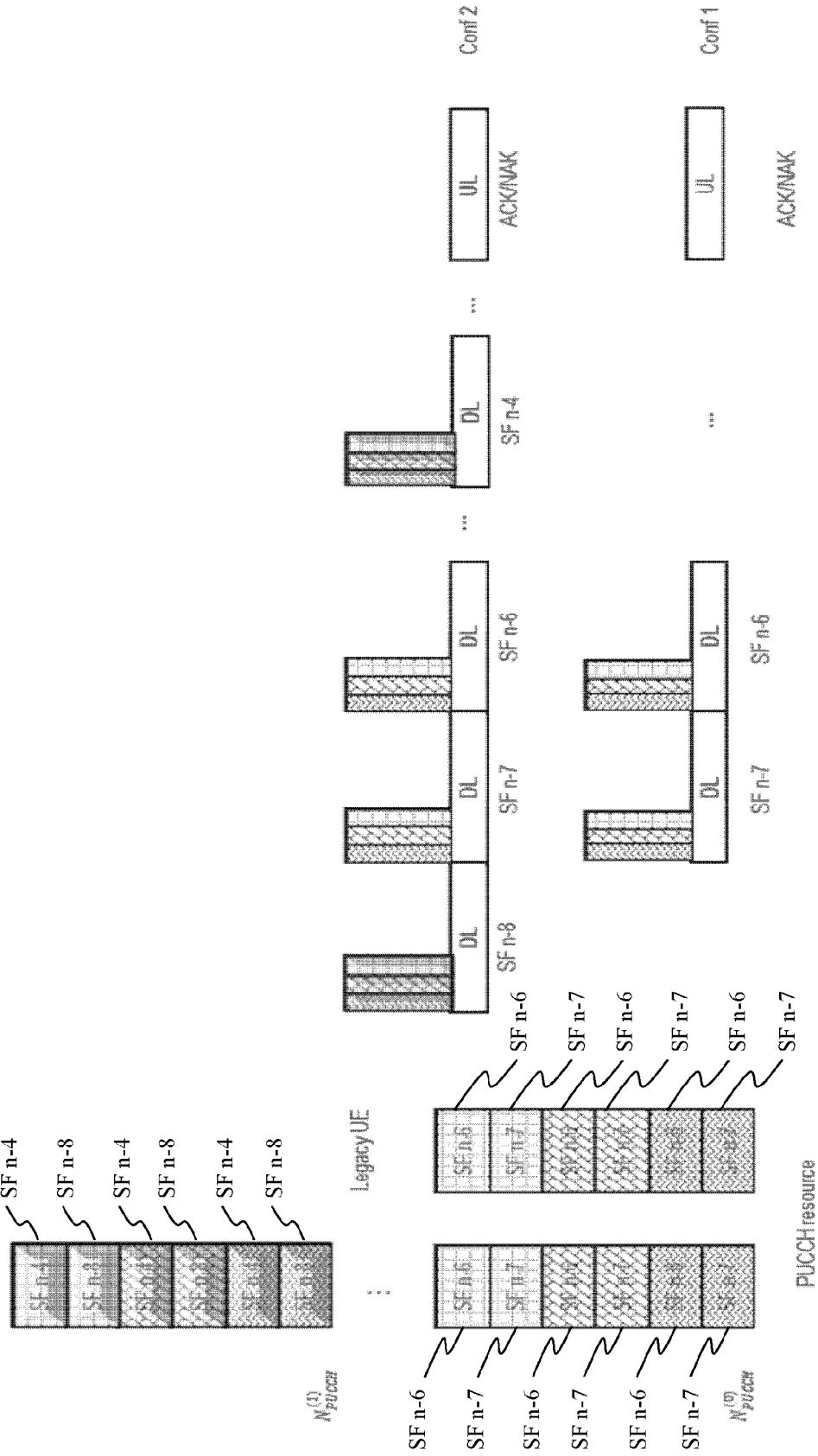
FIG. 7 illustrates an example of how the PUCCH HARQ-ACK resource can be stacked.

In some embodiments of the present disclosure, the steps of 630 and 640 may be performed based on the following formula:

$$n_{PUCCH,i}^{(1)} = (M_q - i - 1) \cdot N_c + i \cdot N_{c+1} + n_{CCE,i} + N_{PUCCH}^{(q)} \quad (1)$$

wherein $n_{PUCCH,i}^{(1)}$ is a PUCCH resource index determined based on resources used in transmission of PDCCHs corresponding to the PDSCHs received in the DL subframe that is the $i^{th}$ element of the $q^{th}$ subset, $M_q$ is the total number of DL subframes in the $q^{th}$ subset, $0 \leq i \leq M_q$, c is selected from {0, 1, 2, 3} such that $N_c \leq n_{CCE,i} < N_{c+1}$, $N_c = \max \{0, \lfloor [N_{RB}^{DL} \cdot (N_{sc}^{RB} \cdot c - 4)]/36 \rfloor\}$ where $N_{RB}^{DL}$ is the number of physical resource blocks, PRBs, in each downlink subframe and where $N_{sc}^{RB}$ is the number of subcarriers in each physical resource block, $n_{CCE,i}$ is the sequence number of the first Control Channel Element, CCE, used for transmission of the corresponding PDCCH in subframe $n-k_i^{(q)}$, $k_i^{(q)}(q=0,1)$ is the $i^{th}$ element of the $q^{th}$ subset, n indicates the UL subframe associated with the DL subframes where the plurality of PDSCHs are received, $N_{PUCCH}^{(q)}$ (q=0,1) is an offset for $q^{th}$ subset, wherein q=0 corresponds to one of the first and second subsets of DL subframes and q=1 corresponds to the FIG. 7 illustrates how the PUCCH HARQ-ACK resource can be stacked. As shown in FIG. 7, subframes SF n-6 and SF n-7 not only belong to Configuration 2 but also belong to configuration 1. Correspondingly, as shown in the left part of FIG. 7, their corresponding PUCCH HARQ-ACK resources may be stacked firstly. That is, PUCCH resource indices for PDSCHs received in the subframes SF n-6 and SF n-7 may be smaller than those for PDSCHs received in the remaining DL subframes. FIG. 7 is just an illustrative example, and the present disclosure is not limited to this example. For example, PUCCH resource indices for PDSCHs received in the subframes SF n-6 and SF n-7 may be larger than those for PDSCHs received in the remaining DL subframes. PUCCH HARQ-ACK resources corresponding to other DL association subframes may be stacked in a similar way but with a separate offset (i.e., $N_{PUCCH}^{(1)}$).

Example 2—TDD Configuration 0 (UL), TDD Configuration 2 (DL)

In this example, for UL subframe 2, the first DL association subset is {6}, and the second DL association subset is {8,7,4}. An example DL association subset is shown in Table 5.

TABLE 5

Example DL association set index K: $\{k_0^{(q)}, \ldots, k_{M_q-1}^{(q)}\}$ for TDD when UL reference TDD configuration is configuration 0 and DL reference TDD configuration is 2

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 2 | — | — | Subset 1: {6} <br> Subset 2: {8, 7, 4} | — | — | — | — | Subset 1: {6} <br> Subset 2: {8, 7, 4} | — | — |

Figure 8:
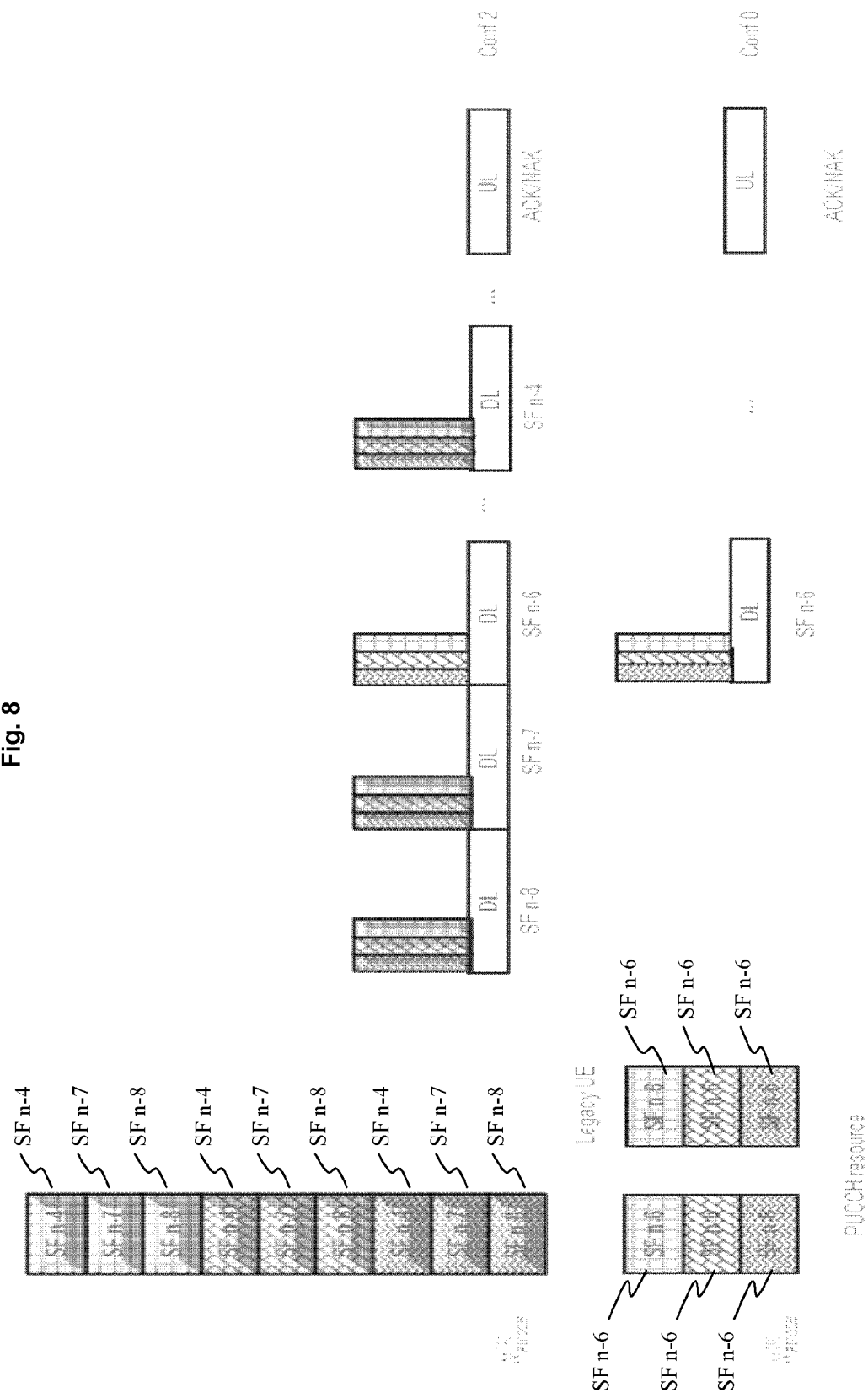
FIG. 8 illustrates an example of how the PUCCH HARQ-ACK resource can be stacked.

FIG. 8 illustrates how the PUCCH HARQ-ACK resource can be stacked. As shown in FIG. 8, subframe SF n-6 not only belongs to Configuration 2, but also belongs to Configuration 0. Correspondingly, as shown in the left part of FIG. 8, their corresponding PUCCH HARQ-ACK resources may be stacked firstly. That is, PUCCH resource indices for PDSCHs received in the subframe SF n-6 may be smaller than those for PDSCHs received in the remaining DL subframes. FIG. 8 is just an illustrative example, and the present disclosure is not limited to this example. For example, PUCCH resource indices for PDSCHs received in the subframe SF n-6 may be larger than those for PDSCHs received in the remaining DL subframes. PUCCH HARQ-ACK resources corresponding to other DL association subframes may be stacked in a similar way but with a separate offset (i.e., $N_{PUCCH}^{(1)}$).

Example 3—TDD Configuration 6 (UL), TDD Configuration 1 (DL)

In this example, for UL subframe 3, the first DL association subset is {7}, and the second DL association subset is {4}. An example DL association subset is shown in Table 6. As shown in Table 6, the second DL association subset for UL subframe 3 contains no DL subframe having the same sequence number as that of any DL subframe in the first DL association subset for UL subframe 3.

In accordance with this example, one or more virtual subframes, i.e., X as shown in Table 6, also referred to as an offset, may be added into the second DL association subset, so as to form a new second DL association subset. The one or more virtual subframes are only used for assigning PUCCH resource indices, but not for real PDSCH transmissions. For example, the one or more virtual subframes may be treated as SF n-7 in this example. In this case, the above Example 1 and Example 2 may be applied to the new second DL association subset.

TABLE 6

Example DL association set index K: $\{k_0^{(q)}, \ldots, k_{M_q-1}^{(q)}\}$ for TDD when UL reference TDD configuration is configuration 6 and DL reference TDD configuration is 1

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 6 | — | — | 7 | 7 | 5 | — | — | 7 | 7 | — |
| 1 | — | — | 7, 6 | X, 4 | — | — | — | 7, 6 | X, 4 | — |

Second Embodiment

As the second embodiment of the invention, a method used in a UE for reporting HARQ ACK/NACK for PDSCH in dynamic TDD configurations is proposed.

Figure 9:
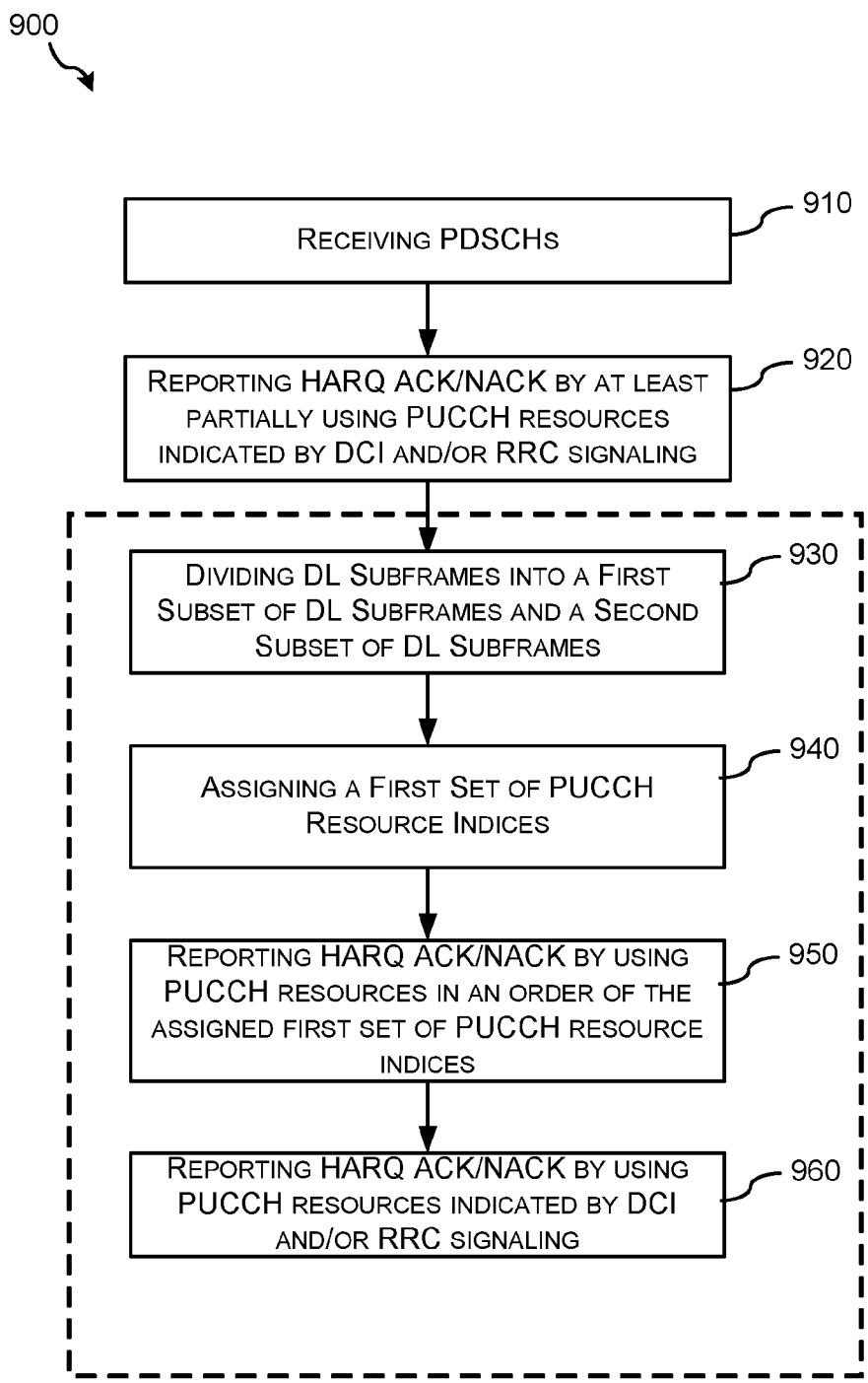
FIG. 9 shows a flowchart of a method used in UE for reporting HARQ ACK/NAK for PDSCH in dynamic TDD configurations according to a second embodiment of the present invention.

In the method, referring to FIG. 9 which shows a flowchart of the method 900, a plurality of PDSCHs are received in DL subframes associated with an UL subframe and indicated by a DL reference TDD configuration (Step 910). For each of the received PDSCHs, HARQ ACK/NACK is reported by at least partially using PUCCH resources indicated by DCI and/or RRC signaling (Step 920).

Optionally, the method 900 may also include the following steps. Firstly, the DL subframes are divided into a first subset of DL subframes and a second subset of DL subframes (Step 930). The first subset of DL subframes is according to this example also indicated by an UL reference TDD configuration. Then, a set of PUCCH resource indices are assigned based on resources used in transmission of PDCCHs corresponding to the PDSCHs received in the DL subframes of the first subset of DL subframes (Step 940). Thereafter, for each of the PDSCHs received in the DL subframes of the first subset of DL subframes, HARQ ACK/NACK is reported by using PUCCH resources in an order of the assigned set of PUCCH resource indices (Step 950). Finally, for each of the PDSCHs received in the DL subframes of the second subset of DL subframes, HARQ ACK/NACK is reported by using PUCCH resources indicated by DCI and/or RRC signaling (Step 960).

In some embodiments of the present disclosure, the second subset of DL subframes may comprise all the DL subframes indicated by the DL reference TDD configuration other than DL subframes of the first subset of DL subframes.

In some embodiments of the present disclosure, the first subset of DL subframes may comprise one or more virtual subframes that are added by the UE, and the one or more virtual subframes may be used only for assigning PUCCH resource indices, but not for real PDSCH transmissions.

For DL subframes in the first subset of DL subframes, corresponding PUCCH resources may be stacked according to the UL reference TDD configuration and implicitly determined by the first CCE index used for transmission of the corresponding PDCCH.

For DL subframes in the second subset of DL subframes, corresponding PUCCH resource may explicitly signaled, e.g. by DCI and/or RRC signaling.

For example, for DL subframes in the first subset of DL subframes, the corresponding PUCCH resource may be determined by the above equation (1). For the DL subframes in the second subset of DL subframes, the UE may use PUCCH resource index $n_{PUCCH,i}^{(1)}$, where the value of $n_{PUCCH,i}^{(1)}$ is determined according to higher layer configuration and/or the predefined mapping rules as shown in Table 7.

One field in the DCI format of the corresponding PDCCH may be used to determine the PUCCH resource values from one of the four resource values configured by higher layers, with the mapping defined in Table 7.

As a non-limiting example, the field in DCI to indicate PUCCH resource values may be some existing field, e.g. the Transport Power Control (TPC) field. When the existing field is reused, if the DCI is granted or received in the second subset of DL subframes, this field is interpreted as PUCCH resource; and if the DCI is granted or received in the first subset of DL subframes, the field is interpreted according to its original definition.

TABLE 7

PUCCH resource value for HARQ-ACK resource for PUCCH

| Value of "command for PUCCH" | $n_{PUCCH,i}^{(1)}$ |
|---|---|
| '00' | The 1$^{st}$ PUCCH resource index configured by the higher layers |
| '01' | The 2$^{nd}$ PUCCH resource index configured by the higher layers |
| '10' | The 3$^{rd}$ PUCCH resource index configured by the higher layers |
| '11' | The 4$^{th}$ PUCCH resource index configured by the higher layers |

As another non-limiting example, new bits may be added to indicate PUCCH resource values. The new field may be added only on the DCI granted or received in the second subset of DL subframes, and the new field may not be available in the DCI granted or received in the first subset of DL subframes.

As another non-limiting example, if a new field is added to indicate PUCCH resource values, the new field may be interpreted as PUCCH resource for DCI granted or received in the second subset of DL subframes, whereas the field may be used for another purpose than PUCCH resource value indication for DCI granted or received in the first subset of DL subframes.

As a non-limiting example, for all DL transmissions, PUCCH resources may be explicitly signaled by dynamic grant, e.g. DCI, and/or RRC signaling.

In this example, the UE may use PUCCH resource index $n_{PUCCH,i}^{(1)}$, where the value of $n_{PUCCH,i}^{(1)}$, is determined according to higher layer configuration and/or a predefined rule, e.g., a predefined table as shown in Table 7.

One field in the DCI format of the corresponding PDCCH may be used to determine the PUCCH resource values from one of the four resource values configured by higher layers, with the mapping defined in Table 7.

Third Embodiment

As the third embodiment of the invention, a method used in a UE for reporting HARQ ACK/NACK for PDSCH in dynamic TDD configurations is proposed.

Figure 10:
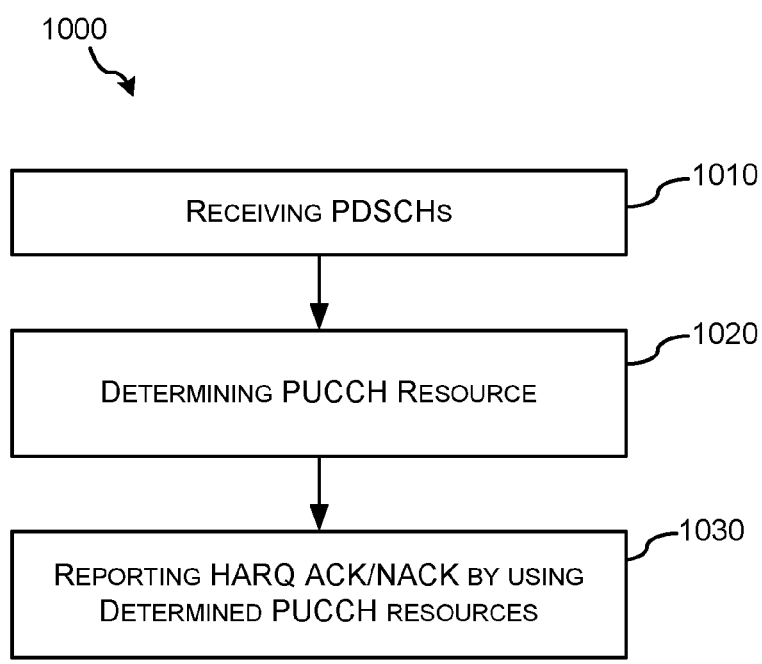
FIG. 10 shows a flowchart of a method used in UE for reporting HARQ ACK/NAK for PDSCH in dynamic TDD configurations according to a third embodiment of the present invention.

In the method, referring to FIG. 10 which shows a flowchart of the method 1000, a plurality of PDSCHs are received in DL subframes associated with an UL subframe and indicated by a DL reference TDD configuration (Step 1010). For each of the received PDSCHs, a PUCCH resource is determined based on resources used in transmission of Physical Downlink Control Channels (PDCCHs) corresponding to the PDSCHs received in the corresponding DL subframe (e.g., the sequence number of the first CCE used for transmission of PDCCHs corresponding to the received PDSCH in the corresponding DL subframe) and a start position of the PUCCH resource corresponding to the DL subframe (Step 1020); and then HARQ ACK/NACK is reported by using the determined PUCCH resource (Step 1030).

If there is no legacy UEs in the system and all the UEs are new release UEs, i.e. Dynamic-TDD-enabled UEs, we can have different offsets per DL subframe. In this case, an index of PUCCH resource $n_{PUCCH,i}^{(1)}$ in subframe i may be determined as follows:

$$n_{PUCCH,i}^{(1)} = n_{CCE,i} + N_{UE\text{-}PUCCH}^{(i,)}$$

where $n_{CCE,i}$ is the number of the first CCE used for transmission of the corresponding PDCCH in subframe n–$k_i$, $N_{UE\text{-}PUCCH}^{(i)}$ is the offset corresponding to the DL subframe n–$k_i$, and $N_{UE\text{-}PUCCH}^{(i)}$ is configured by higher layers.

In the following, an example will be explained in detail by assuming that the UL reference TDD configuration is TDD configuration 0, and the DL reference TDD configuration is TDD configuration 2. In these examples, the subframes #3, #4, #8 and #9 are flexible subframes that can be allocated as UL and DL subframes.

Example 1—TDD Configuration 0 (UL), TDD Configuration 2 (DL)

In this example, for UL subframe 2, the first DL association subset is {SF n-6}, and the second DL association subset is {SF n-8, SF n-7, SF n-4}, as shown in Table 5.

Figure 11:
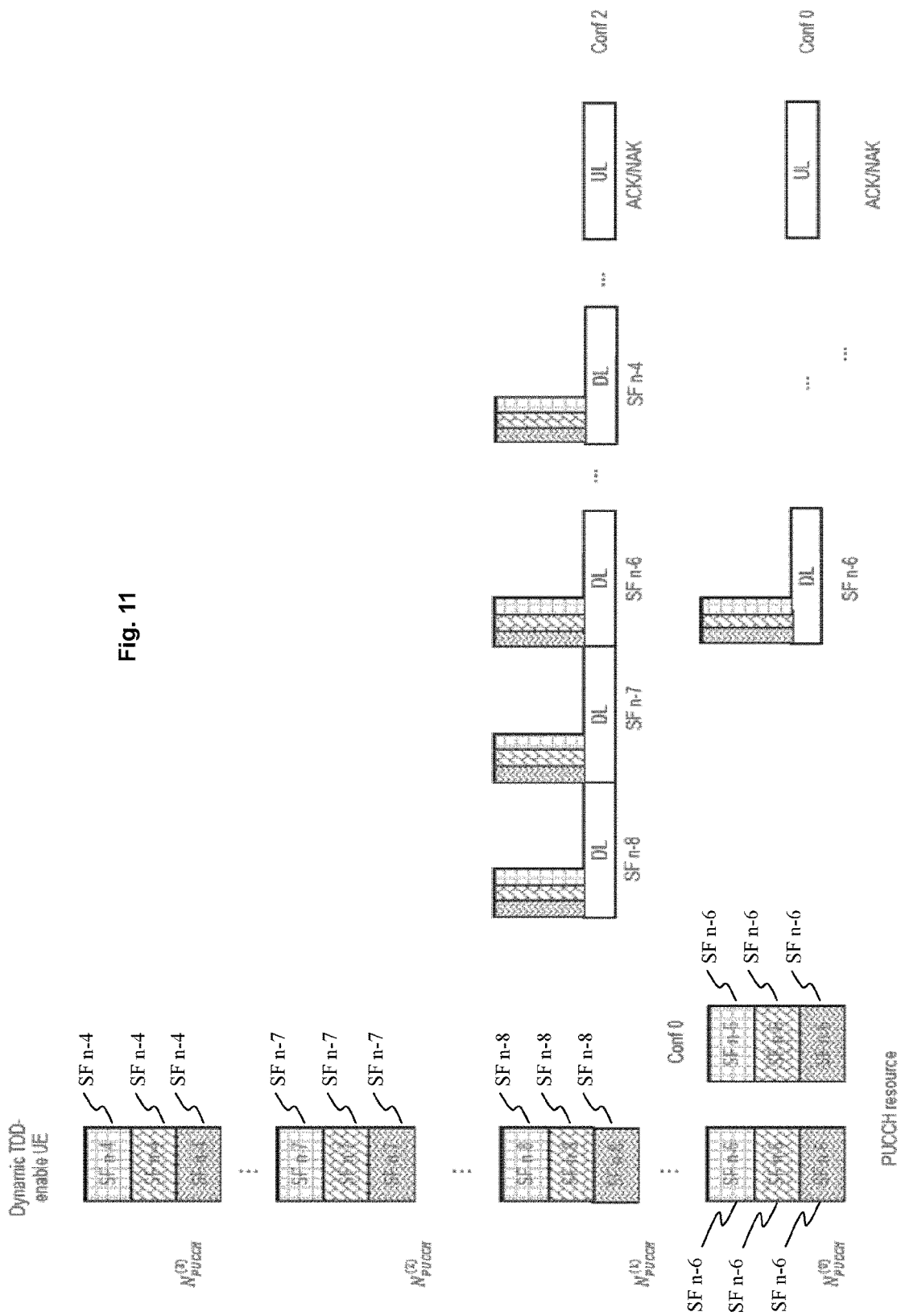
FIG. 11 illustrates an example of how the PUCCH HARQ-ACK resources may be stacked.

FIG. 11 illustrates an example of how the PUCCH HARQ-ACK resources may be stacked. As shown in FIG. 11, PUCCH HARQ-ACK resources for all CCE indices of each DL subframe, i.e., all three one-third CCEs of the DL subframe, are stacked continuously, and each DL subframe corresponds to an offset.

In this example, a start position of a PUCCH resource corresponding to the DL subframe may be separately configured using related information informed by broadcasting, RRC signaling, MAC CE, etc.

Fourth Embodiment

As the fourth embodiment of the invention, a method used in a UE for reporting HARQ ACK/NACK for PDSCH in dynamic TDD configurations is proposed.

Figure 12:
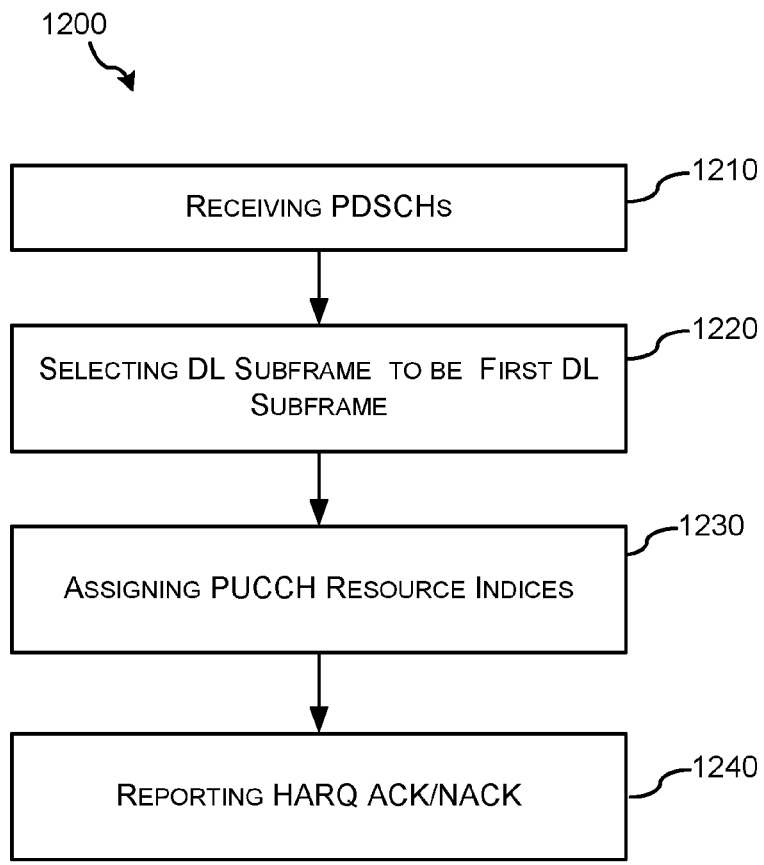
FIG. 12 shows a flowchart of a method used in UE for reporting HARQ ACK/NAK for PDSCH in dynamic TDD configurations according to a fourth embodiment of the present invention.

In the method, referring to FIG. 12 which shows a flowchart of the method 1200, a plurality of PDSCHs are received in DL subframes associated with an UL subframe and indicated by a DL reference TDD configuration (Step 1210). A DL subframe of the DL subframes is selected to be a first DL subframe (Step 1220), so that the sequence number of the selected DL subframe is the same as that of a first DL subframe of DL subframes associated with the UL subframe but indicated by an UL reference TDD configuration. PUCCH resource indices are assigned based on resources used in transmission of PDCCHs corresponding to the PDSCHs received in the DL subframes associated with the UL subframe and indicated by the DL reference TDD configuration (Step 1230). The PUCCH resource indices are assigned in an order starting from the selected first DL subframe of the DL subframes associated with the UL subframe and indicated by the DL reference TDD configuration. For each of the received PDSCHs, HARQ ACK/NACK is reported by using PUCCH resources in the order of the assigned PUCCH resource indices (Step 1240).

In this embodiment, the same resource allocation method is used as for the legacy user or UE, but a different order is used for the DL association set for the specific subframe.

The new permutation may be indicated by a new look-up table or by rules specified in the standard.

In some examples, the order of the values in the DL association set may be rearranged such that the first values in the DL association set of DL reference TDD configuration match the values in the DL association set for the UL reference/broadcasted TDD configuration for the same subframe, where possible.

In some examples, also other values in the DL association set may be rearranged in order to match the likelihood of the subframes to be used for DL transmissions. For example, subframes related to DL in both the UL and the DL reference TDD configuration may be mapped first. Subframes having different directions in the two configurations could then be mapped in order counting from the UL to DL switching-point in the UL configuration.

Table 8 shows an example DL association set index according to the fourth embodiment.

TABLE 8

Example DL association set index K: $\{k_0^{(q)}, \ldots, k_{M_q-1}^{(q)}\}$ for TDD when UL reference TDD configuration is configuration 0 and DL reference TDD configuration is 2

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 2 | — | — | 6, 7, 8, 4 ~~8, 7, 4, 6~~ | — | — | — | — | 6, 7, 8, 4 ~~8, 7, 4, 6~~ | — | — |

Figure 13:
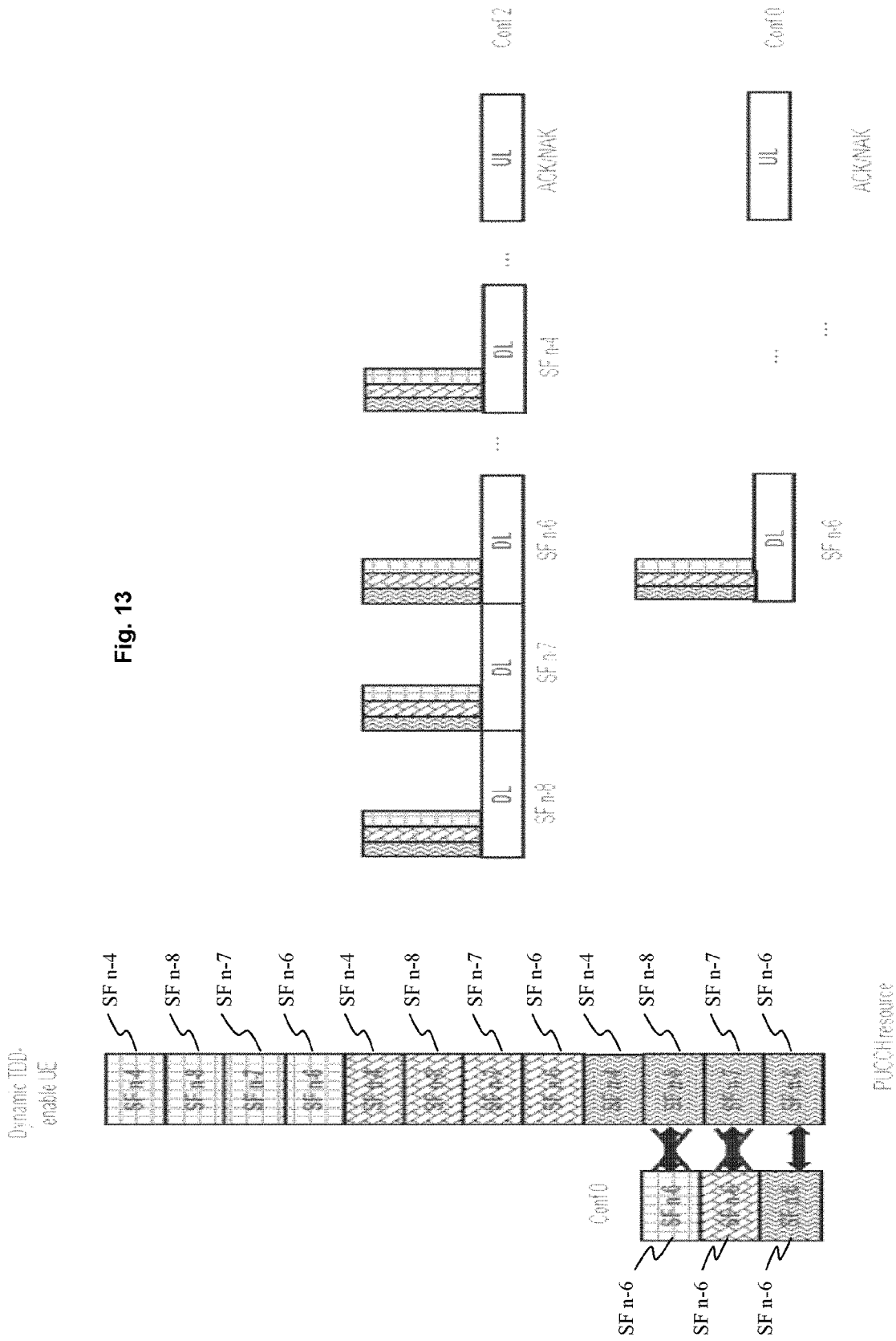
FIG. 13 illustrates an example of how the PUCCH HARQ-ACK resources may be stacked.

As shown in Table 8, DL subframes in the original second DL association set for UL subframe SF n-2, i.e., {SF n-8, SF n-7, SF n-4, SF n-6}, may be rearranged as {SF n-6, SF n-7, SF n-8, SF n-4}, so that PUCCH resources for responding to PDSCHs transmitted in the subframe SF n-6 may be stacked firstly. This may be illustrated in FIG. 13.

Figure 14:
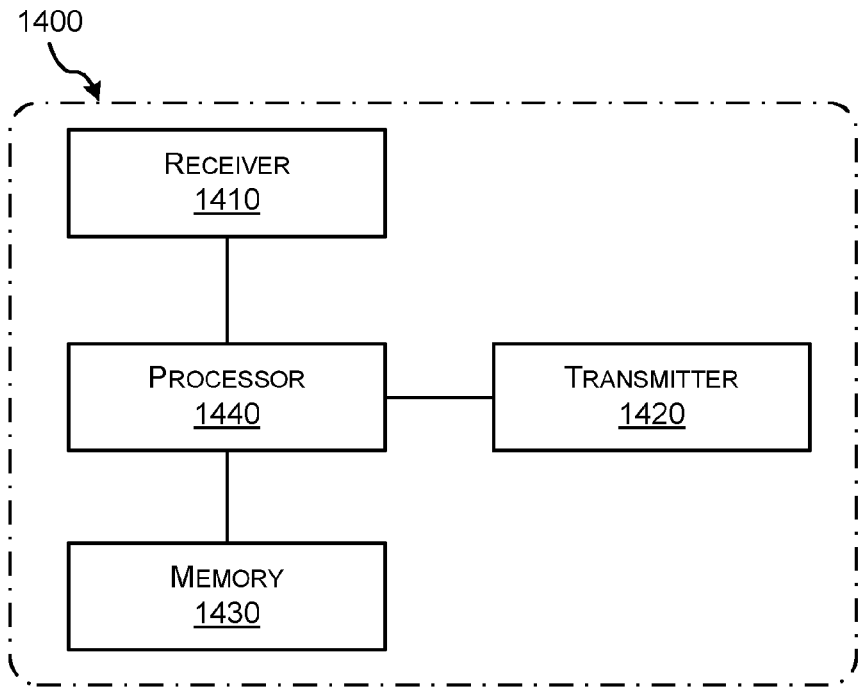
FIG. 14 is a schematic block diagram of UE 1400 according to some embodiments of the present disclosure.

FIG. 14 is a schematic block diagram of a UE 1400 according to some embodiments of the present disclosure.

As shown, UE 1400 includes a receiver 1410, a transmitter 1420, a memory 1430 and a processor 1440. The memory 1430 is configured to store TDD configurations, e.g., TDD configurations 0-6. The processor 1440 is configured to control, e.g., according to instructions stored in the memory 1430, the receiver 1410 to receive a plurality of PDSCHs in DL subframes associated with an UL subframe and indicated by a DL reference TDD configuration. The processor 1440 is further configured to divide the DL subframes into a first subset of DL subframes and a second subset of DL subframes. The first subset of DL subframes is also indicated by an UL reference TDD configuration. The processor 1440 is also configured to assign a first set of PUCCH resource indices based on resources used in transmission of PDCCHs corresponding to the PDSCHs received in the DL subframes of the first subset of DL subframes. Moreover, the processor 1440 is configured to assign a second set of PUCCH resource indices based on resources used in transmission of PDCCHs corresponding to the PDSCHs received in the DL subframes of the second subset of DL subframes. The processor 1440 is also configured to control, e.g., according to instructions stored in the memory 1430, the transmitter 1420 to, for each of the received PDSCHs, report HARQ ACK/NACK by using PUCCH resources in an order of the assigned first set of PUCCH resource indices for PDSCHs received in the DL subframes of the first subset of DL subframes and in an order of the assigned second set of PUCCH resource indices for PDSCHs received in the DL subframes of the second subset of DL subframes.

For example, the processor 1440 may be configured to assign the first set of PUCCH resource indices and the second set of PUCCH resource indices based on the following formula:

$$n_{PUCCH,i}^{(1)} = (M_q - i - 1) \cdot N_c \cdot N_{c+1} + n_{CCE,i} + N_{PUCCH}^{(q)}.$$

wherein $n_{PUCCH,i}^{(1)}$ is a PUCCH resource index determined based on resources used in transmission of PDCCHs corresponding to the PDSCHs received in the DL subframe that is the $i^{th}$ element of the $q^{th}$ subset, $M_q$ is the total number of DL subframes in the $q^{th}$ subset, $0 \leq i < M_q$, c is selected from $\{0,1,2,3\}$ such that $N_c \leq n_{CCE,i} < N_{c+1}$, $N_c = \max\{0, \lfloor [N_{RB}^{DL} \cdot (N_{sc}^{RB} \cdot c - 4)/36] \rfloor\}$ where $N_{RB}^{DL}$ is the number of physical resource blocks, PRBs, in each downlink subframe and where $N_{sc}^{RB}$ is the number of subcarriers in each physical resource block, $n_{CCE,i}$ is the sequence number of the first Control Channel Element, CCE, used for transmission of the corresponding PDCCH in subframe $n - k_i^{(q)}$, $k_i^{(q)}$ (q=0,1) is the $i^{th}$ element of the $q^{th}$ subset, n indicates the UL subframe associated with the DL subframes where the plurality of PDSCHs are received, $N_{PUCCH}^{(q)}$ (q=0,1) is an offset for $q^{th}$ subset, wherein q=0 corresponds to one of the first and second subsets of DL subframes and q=1 corresponds to the other one of the first and second subsets of DL subframes.

As above, there may be an offset between the first set of PUCCH resource indices and the second set of PUCCH resource indices.

As above, the offset may be configured by higher layers or predefined.

As above, the second subset of DL subframes may comprise all the DL subframes indicated by the DL reference TDD configuration other than DL subframes of the first subset of DL subframes.

The processor 1440 may further be configured to add one or more virtual subframes to the first subset of DL subframes. The one or more virtual subframes may be used for assigning PUCCH resource indices, but not for real PDSCH transmissions.

Figure 15:
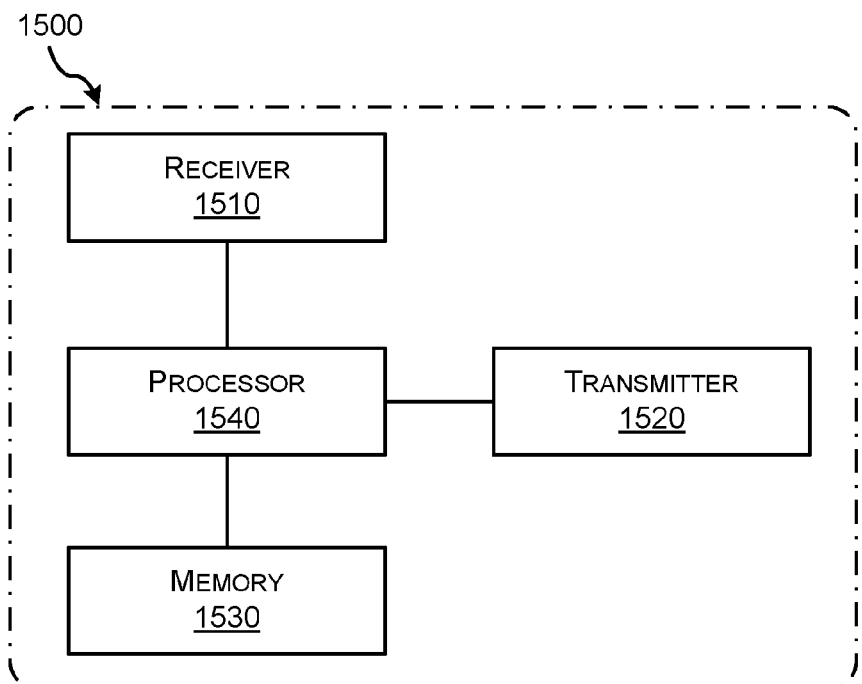
FIG. 15 is a schematic block diagram of UE 1500 according to some embodiments of the present disclosure.

FIG. 15 is a schematic block diagram of a UE 1500 according to some embodiments of the present disclosure.

As shown, UE 1500 includes a receiver 1510, a transmitter 1520, a memory 1530 and a processor 1540. The memory 1530 is configured to store TDD configurations, e.g., TDD configurations 0-6. The processor 1540 is configured to control, e.g., according to instructions stored in the memory 1530, the receiver 1510 to receive a plurality of PDSCHs in DL subframes associated with an UL subframe and indicated by a DL reference TDD configuration. The processor 1540 is also configured to control, e.g., according to instructions stored in the memory 1530, the transmitter 1520 to, for each of the received PDSCHs, report HARQ ACK/NACK by at least partially using PUCCH resources indicated by DCI and/or RRC signaling.

Alternatively or additionally, the processor 1540 may be configured to divide the DL subframes into a first subset of DL subframes and a second subset of DL subframes. The first subset of DL subframes is according to this example also indicated by an UL reference TDD configuration. The processor 1540 may further be configured to assign a set of PUCCH resource indices based on resources used in transmission of PDCCHs corresponding to the PDSCHs received in the DL subframes of the first subset of DL subframes. In this case, the processor 1540 may also be configured to control, e.g., according to instructions stored in the memory 1530, the transmitter 1520 to, for each of the PDSCHs received in the DL subframes of the first subset of DL subframes, report HARQ ACK/NACK by using PUCCH resources in an order of the assigned set of PUCCH resource indices. Finally, the processor 1540 may be configured to control, e.g., according to instructions stored in the memory 1530, the transmitter 1520 to, for each of the PDSCHs received in the DL subframes of the second subset of DL subframes, report HARQ ACK/NACK by using PUCCH resources indicated by DCI and/or RRC signaling.

As above, the second subset of DL subframes may comprise all the DL subframes indicated by the DL reference TDD configuration other than DL subframes of the first subset of DL subframes.

The processor 1540 may further be configured to add one or more virtual subframes to the first subset of DL subframes. The one or more virtual subframes may be used for assigning PUCCH resource indices, but not for real PDSCH transmissions.

Figure 16:
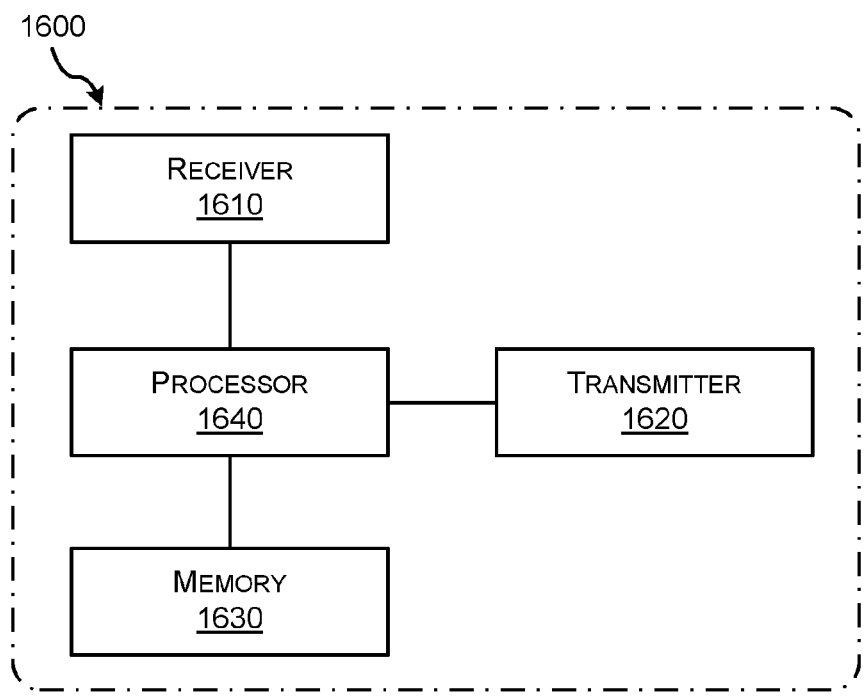
FIG. 16 is a schematic block diagram of UE 1600 according to some embodiments of the present disclosure.

FIG. 16 is a schematic block diagram of a UE 1600 according to some embodiments of the present disclosure.

As shown, UE 1600 includes a receiver 1610, a transmitter 1620, a memory 1630 and a processor 1640. The memory 1630 is configured to store TDD configurations, e.g., TDD configurations 0-6. The processor 1640 is configured to control, e.g., according to instructions stored in the memory 1630, the receiver 1610 to receive a plurality of PDSCHs in DL subframes associated with an UL subframe and indicated by a DL reference TDD configuration. The processor 1640 is further configured to determine, for each of the received PDSCHs, a PUCCH resource based on resources used in transmission of Physical Downlink Control Channels (PDCCHs) corresponding to the PDSCHs received in the corresponding DL subframe (e.g., the sequence number of the first CCE used for transmission of PDCCHs corresponding to the received PDSCH in the corresponding DL subframe) and a start position of the PUCCH resource corresponding to the DL subframe. The processor 1640 is also configured to control, e.g., according to instructions stored in the memory 1630, the transmitter 1620 to, for each of the received PDSCHs, report HARQ ACK/NACK by using the determined PUCCH resource.

As above, the start position may be configured by higher layers or predefined.

As above, the start position may be configured using related information informed by broadcasting, RRC signaling, or MAC CE.

Figure 17:
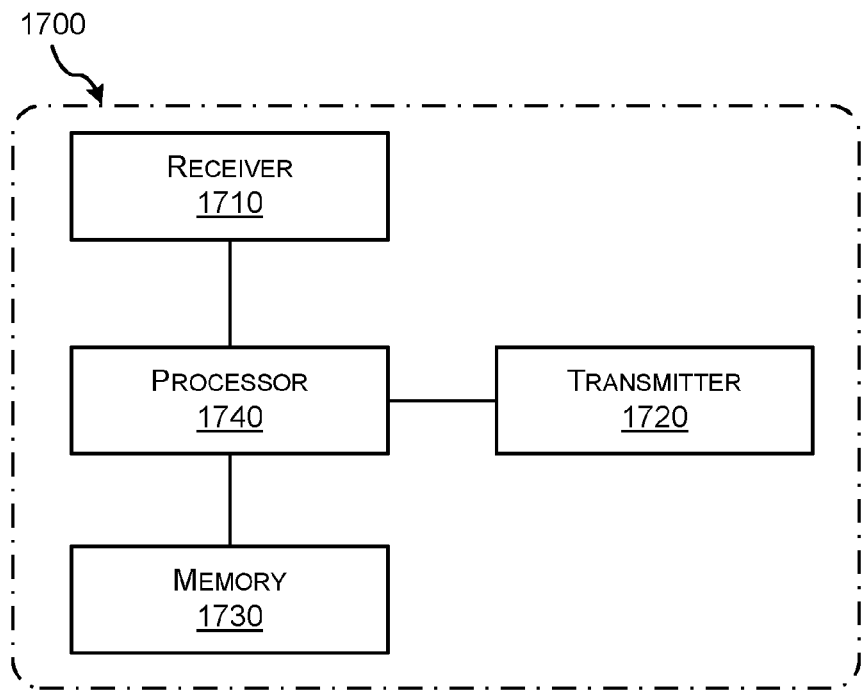
FIG. 17 is a schematic block diagram of UE 1700 according to some embodiments of the present disclosure.

FIG. 17 is a schematic block diagram of a UE 1700 according to some embodiments of the present disclosure.

As shown, UE 1700 includes a receiver 1710, a transmitter 1720, a memory 1730 and a processor 1740. The memory 1730 is configured to store TDD configurations, e.g., TDD configurations 0-6. The processor 1740 is configured to control, e.g., according to instructions stored in the memory 1730, the receiver 1710 to receive a plurality of PDSCHs in DL subframes associated with an UL subframe and indicated by a DL reference TDD configuration. The processor 1740 is further configured to select a DL subframe of the DL subframes to be a first DL subframe. The sequence number of the selected DL subframe is the same as that of a first DL subframe of DL subframes associated with the UL subframe but indicated by an UL reference TDD configuration. The processor 1740 is further configured to assign PUCCH resource indices based on resources used in transmission of PDCCHs corresponding to the PDSCHs received in the DL subframes associated with the UL subframe and indicated by the DL reference TDD configuration. The PUCCH resource indices are assigned in an order starting from the selected first DL subframe of the DL subframes associated with the UL subframe and indicated by the DL reference TDD configuration. The processor 1740 is further configured to control, e.g., according to instructions stored in the memory 1730, the transmitter 1720 to, for each of the received PDSCHs, report HARQ ACK/NACK by using PUCCH resources in the order of the assigned PUCCH resource indices.

As described in the above embodiments, legacy UEs as well as Dynamic-TDD-enabled UEs can be supported and the PUCCH HARQ-ACK resource conflict problem caused by dynamic TDD configuration is solved, while efficiently compressing PUCCH HARQ-ACK resource to improve the resource utilization efficiency.

Fifth Embodiment

As the fifth embodiment of the invention, a method used in a BS for receiving HARQ ACK/NACK for PDSCH in dynamic TDD configurations is proposed.

Figure 18:
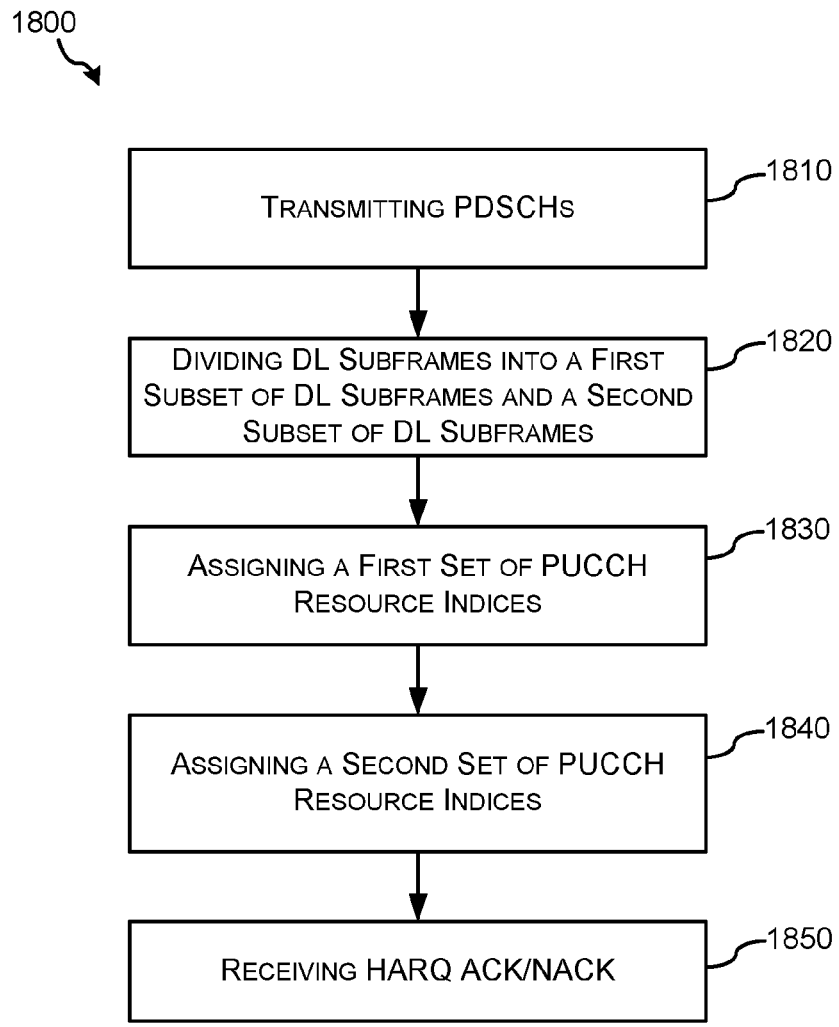
FIG. 18 shows a flowchart of a method used in BS for receiving HARQ ACK/NAK for PDSCH in dynamic TDD configurations according to a fifth embodiment of the present invention.

In the method, referring to FIG. 18 which shows a flowchart of the method 1800, a plurality of PDSCHs are transmitted in DL subframes associated with an UL subframe and indicated by a DL reference TDD configuration (Step 1810). The DL subframes are divided into a first subset of DL subframes and a second subset of DL subframes (Step 1820). The first subset of DL subframes is also indicated by an UL reference TDD configuration. Hereinafter, DL subframes associated with the UL subframe and indicated by a UL reference TDD configuration may be referred to as the first DL association subframes of the UL subframe, and DL subframes associated with a UL subframe and indicated by a DL reference TDD configuration may be referred to as the second DL association subframes of the UL subframe. Thus, the first subset of DL subframes and the second subset of DL subframes may be referred to as the first DL association subset and the second DL association subset, respectively. Then, a first set of PUCCH resource indices are assigned based on resources used in transmission of PDCCHs corresponding to the PDSCHs transmitted in the DL subframes of the first subset of DL subframes (Step 1830), and a second set of PUCCH resource indices are assigned based on resources used in transmission of PDCCHs corresponding to the PDSCHs transmitted in the DL subframes of the second subset of DL subframes (Step 1840). Thereafter, for each of the transmitted PDSCHs, HARQ ACK/NACK is received by using PUCCH resources in an order of the assigned first set of PUCCH resource indices for PDSCHs transmitted in the DL subframes of the first subset of DL subframes and in an order of the assigned second set of PUCCH resource indices for PDSCHs transmitted in the DL subframes of the second subset of DL subframes (Step 1850).

In the present disclosure, there is an offset between the first set of PUCCH resource indices and the second set of PUCCH resource indices. The offset herein may be configured by higher layers or predefined. For example, the offset may be notified by the eNB via RRC signaling or MAC CE.

In the present disclosure, the first set of PUCCH resource indices and the second set of PUCCH resource indices may have different start positions, which may be referred to as start positions of PUCCH resources.

In some embodiments of the present disclosure, the steps of 1830 and 1840 may be performed based on the following formula:

$$n_{PUCCH,i}^{(1)} = (M_q - i - 1) \cdot N_c \cdot N_{c+1} + n_{CCE,i} + N_{PUCCH}^{(q)}, \quad (2)$$

wherein $n_{PUCCH,i}^{(1)}$ is a PUCCH resource index determined based on resources used in transmission of PDCCHs corresponding to the PDSCHs received in the DL subframe that is the 'th element of the $q^{th}$ subset, $M_q$ is the total number of DL subframes in the $q^{th}$ subset, $0 \le i < M_q$, c is selected from $\{0,1,2,3\}$ such that $N_c \le n_{CCE,i} < N_{c+1}$, $N_c = \max\{0, \lfloor [N_{RB}^{DL} \cdot (N_{sc}^{RB} \cdot c - 4)]/36 \rfloor\}$ where $N_{RB}^{DL}$ is the number of physical resource blocks, PRBs, in each downlink subframe and where $N_{sc}^{RB}$ is the number of subcarriers in each physical resource block, $n_{CCE,i}$ is the sequence number of the first Control Channel Element, CCE, used for transmission of the corresponding PDCCH in subframe $n-k_i^{(q)}$, $k_i^{(q)}(q=0,1)$ is the $i^{th}$ element of the $q^{th}$ subset, n indicates the UL subframe associated with the DL subframes where the plurality of PDSCHs are received, $N_{PUCCH}^{(q)}(q=0,1)$ is an offset for $q^{th}$ subset, wherein q=0 corresponds to one of the first and second subsets of DL subframes and q=1 corresponds to the other one of the first and second subsets of DL subframes. The offset may be configured by higher layers.

In some embodiments of the present disclosure, the second subset of DL subframes may comprise all the DL subframes indicated by the DL reference TDD configuration other than DL subframes of the first subset of DL subframes.

In some embodiments of the present disclosure, the first subset of DL subframes may comprise one or more virtual subframes that are added by the BS, and the one or more virtual subframes may be used only for assigning PUCCH resource indices, but not for real PDSCH transmissions.

In the following, some examples will be explained in detail by assuming that the UL reference TDD configuration is TDD configuration 0 or TDD configuration 1 or TDD configuration 6, and the DL reference TDD configuration is TDD configuration 1 or TDD configuration 2. In these examples, the subframes #3, #4, #8 and #9 are flexible subframes that can be allocated as UL and DL subframes.

Example 1—TDD Configuration 1 (UL), TDD Configuration 2 (DL)

In this example, for UL subframe 2, the first DL association subset can be {7, 6}, and the second DL association subset can be {8,4}. An example DL association subset is shown in Table 9.

TABLE 9

Example DL association set index K: $\{k_0^{(q)}, \ldots, k_{M_q-1}^{(q)}\}$ for TDD when UL reference TDD configuration is configuration 1 and DL reference TDD configuration is 2.

| UL-DL Configuration | \multicolumn{10}{c}{Subframe n} |
|---|---|---|---|---|---|---|---|---|---|---|
| | 0 | 1 | 2 | 3 | 4 | 5 | 6 | 7 | 8 | 9 |
| 1 | — | — | {7, 6} | — | 4 | — | — | {7, 6} | — | 4 |
| 2 | — | — | Subset 1: {7, 6} Subset 2: {8, 4} | — | — | — | — | Subset 1: {7, 6} Subset 2: {8, 4} | — | — |

Figure 19:
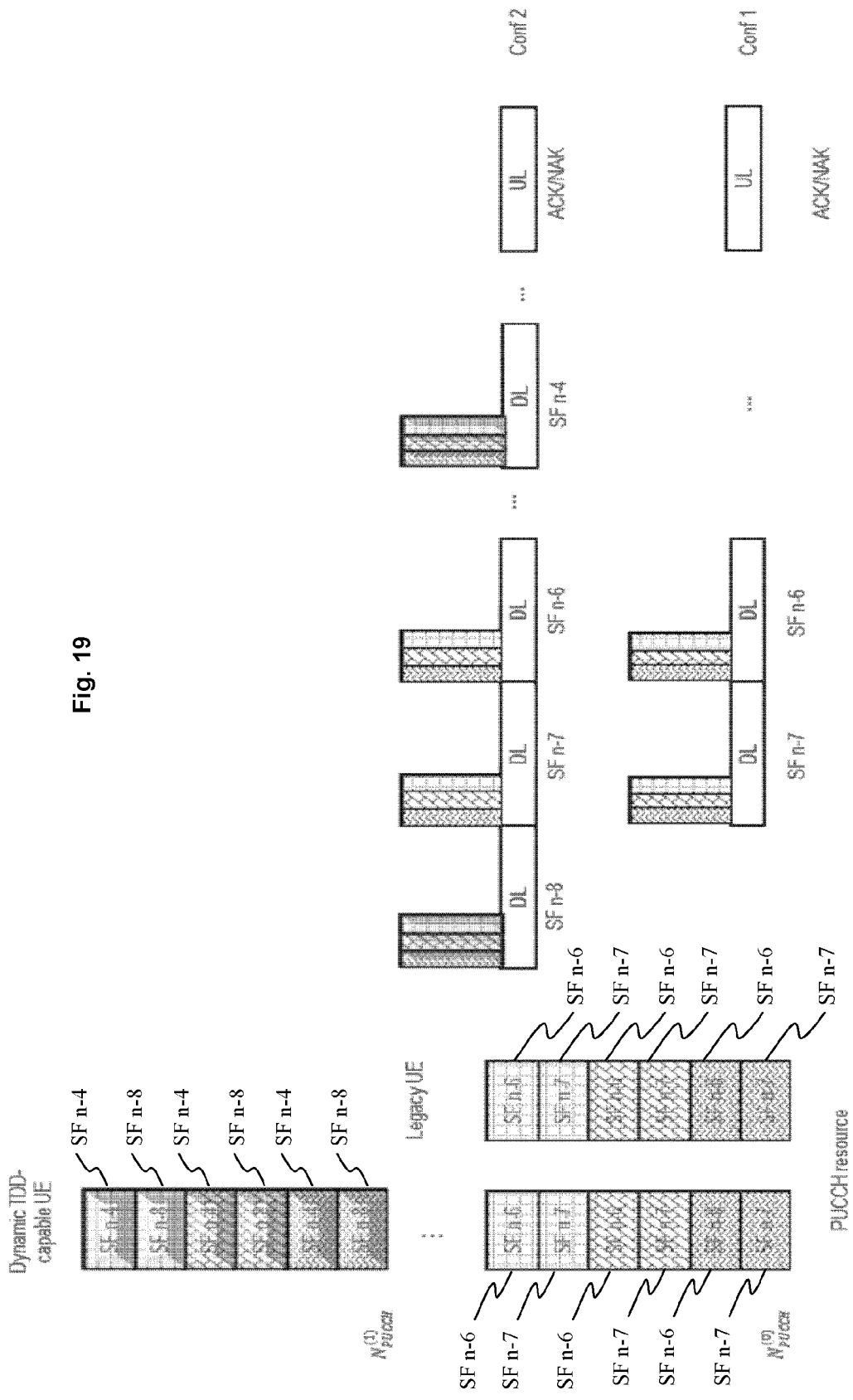
FIG. 19 illustrates an example of how the PUCCH HARQ-ACK resource can be stacked.

FIG. 19 illustrates how the PUCCH HARQ-ACK resource can be stacked. As shown in FIG. 19, subframes SF n-6 and SF n-7 not only belong to Configuration 2 but also belong to configuration 1. Correspondingly, as shown in the left part of FIG. 19, their corresponding PUCCH HARQ-ACK resources may be stacked firstly. That is, PUCCH resource indices for PDSCHs transmitted in the subframes SF n-6 and SF n-7 may be smaller than those for PDSCHs transmitted in the remaining DL subframes. FIG. 19 is just an illustrative example, and the present disclosure is not limited to this example. For example, PUCCH resource indices for PDSCHs transmitted in the subframes SF n-6 and SF n-7 may be larger than those for PDSCHs transmitted in the remaining DL subframes. PUCCH HARQ-ACK resources corresponding to other DL association subframes, may be stacked in a similar way but with a separate offset (i.e., $N_{PUCCH}^{(1)}$).

Example 2—TDD Configuration 0 (UL), TDD Configuration 2 (DL)

In this example, for UL subframe 2, the first DL association subset is {6}, and the second DL association subset is {8,7,4}. An example DL association subset is shown in Table 10.

TABLE 10

Example DL association set index K: $\{k_0^{(q)}, \ldots, k_{M_q-1}^{(q)}\}$ for TDD when UL reference TDD configuration is configuration 0 and DL reference TDD configuration is 2

| UL-DL Configuration | \multicolumn{10}{c}{Subframe n} |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 2 | — | — | Subset 1: {6} Subset 2: {8, 7, 4} | — | — | — | — | Subset 1: {6} Subset 2: {8, 7, 4} | — | — |

Figure 20:
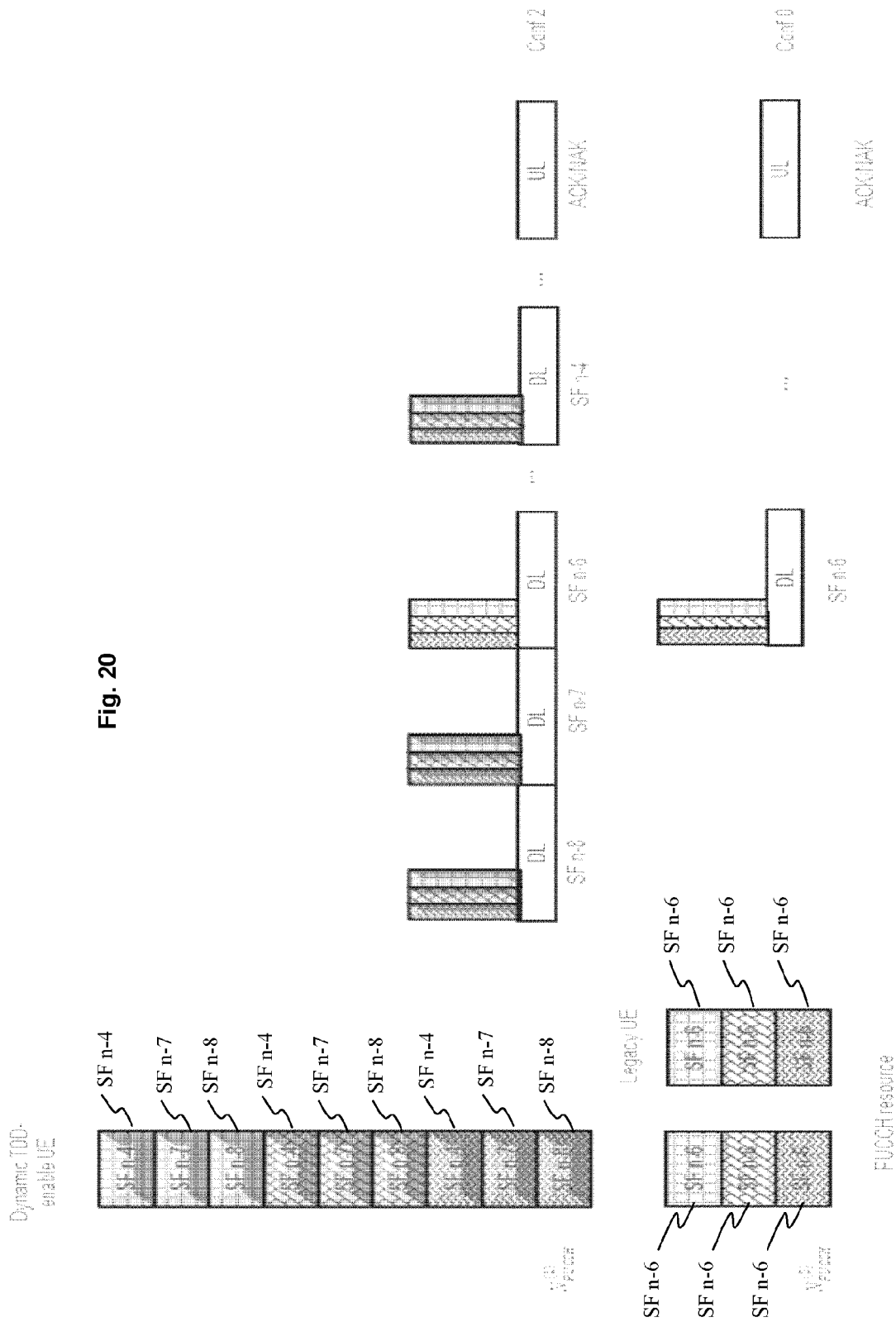
FIG. 20 illustrates an example of how the PUCCH HARQ-ACK resource can be stacked.

FIG. 20 illustrates how the PUCCH HARQ-ACK resource can be stacked. As shown in FIG. 20, subframe SF n-6 not only belongs to Configuration 2, but also belongs to Configuration 0. Correspondingly, as shown in the left part of FIG. 20, their corresponding PUCCH HARQ-ACK resources may be stacked firstly. That is, PUCCH resource indices for PDSCHs transmitted in the subframe SF n-6 may be smaller than those for PDSCHs transmitted in the remaining DL subframes. FIG. 20 is just an illustrative example, and the present disclosure is not limited to this example. For example, PUCCH resource indices for PDSCHs transmitted in the subframe SF n-6 may be larger than those for PDSCHs transmitted in the remaining DL subframes. PUCCH HARQ-ACK resources corresponding to other DL association subframes may be stacked in a similar way but with a separate offset (i.e., $N_{PUCCH}^{(1)}$).

Example 3—TDD Configuration 6 (UL), TDD Configuration 1 (DL)

In this example, for UL subframe 3, the first DL association subset is {7}, and the second DL association subset is {4}. An example DL association subset is shown in Table 11. As shown in Table 11, the second DL association subset for UL subframe 3 contains no DL subframe having the same sequence number as that of any DL subframe in the first DL association subset for UL subframe 3.

In accordance with this example, one or more virtual subframes, i.e., X as shown in Table 11, also referred to as an offset, may be added into the second DL association subset, so as to form a new second DL association subset. The one or more virtual subframes are only used for assigning the second set of PUCCH resource indices, but not for real PDSCH transmissions. For example, the one or more virtual subframes may be treated as SF n-7 in this example. In this case, the above Example 1 and Example 2 may be applied to the new second DL association subset.

TABLE 11

Example DL association set index K: $\{k_0^{(q)}, \ldots, k_{M_q-1}^{(q)}\}$ for TDD when UL reference TDD configuration is configuration 6 and DL reference TDD configuration is 1

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 6 | — | — | 7 | 7 | 5 | — | — | 7 | 7 | — |
| 1 | — | — | 7, 6 | X, 4 | — | — | — | 7, 6 | X, 4 | — |

Sixth Embodiment

As the sixth embodiment of the invention, a method used in a BS for receiving HARQ ACK/NACK for PDSCH in dynamic TDD configurations is proposed.

Figure 21:
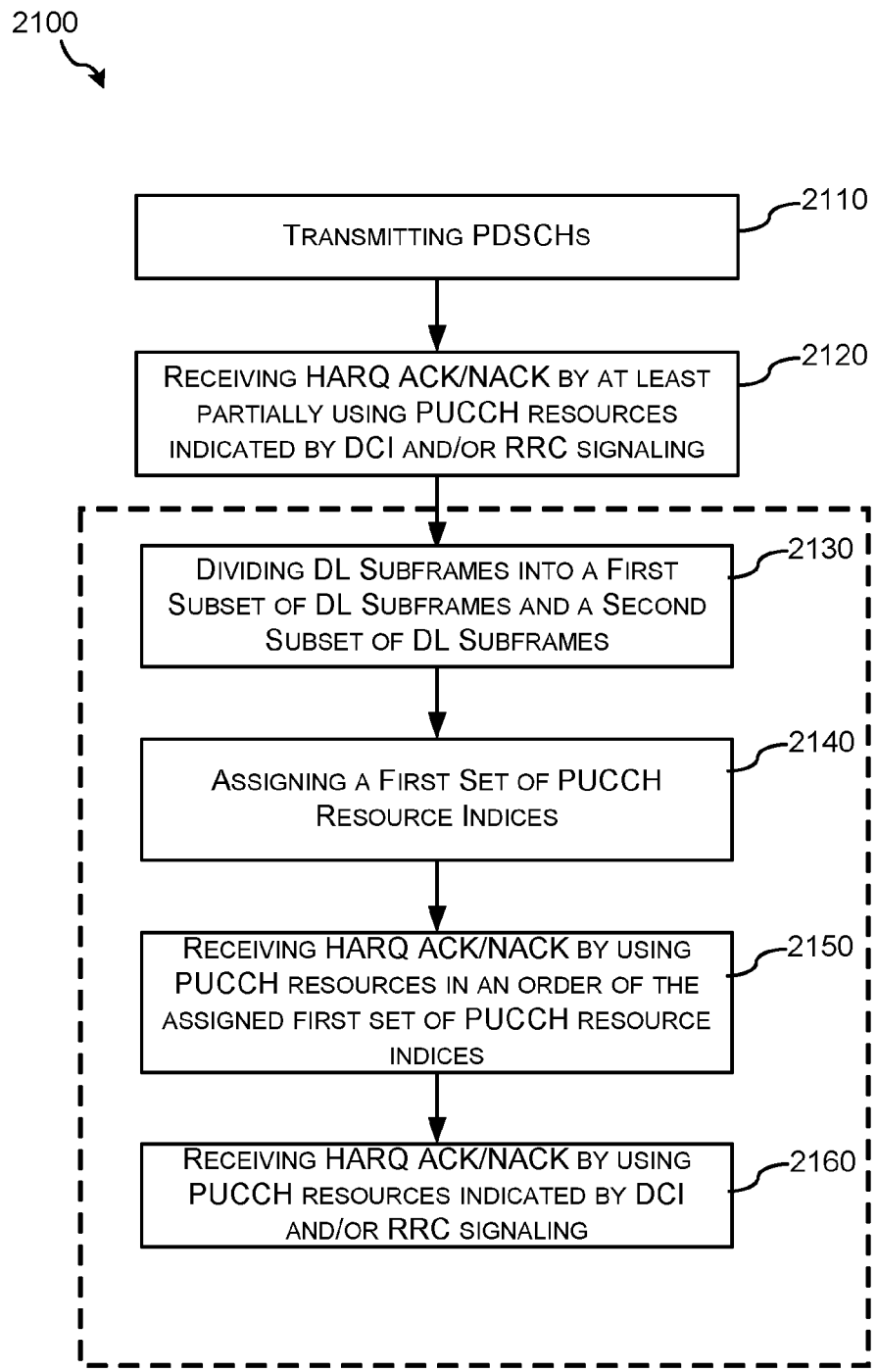
FIG. 21 shows a flowchart of a method used in BS for receiving HARQ ACK/NAK for PDSCH in dynamic TDD configurations according to a sixth embodiment of the present invention.

In the method, referring to FIG. 21 which shows a flowchart of the method 2100, a plurality of PDSCHs are transmitted in DL subframes associated with an UL subframe and indicated by a DL reference TDD configuration (Step 2110). For each of the transmitted PDSCHs, HARQ ACK/NACK is received by at least partially using PUCCH resources indicated by DCI and/or RRC signaling (Step 2120).

Optionally, the method 2100 may also include the following steps. Firstly, the DL subframes are divided into a first subset of DL subframes and a second subset of DL subframes (Step 2130). The first subset of DL subframes is also indicated by an UL reference TDD configuration. Then, a set of PUCCH resource indices are assigned based on resources used in transmission of PDCCHs corresponding to the PDSCHs transmitted in the DL subframes of the first subset of DL subframes (Step 2140). Thereafter, for each of the PDSCHs transmitted in the DL subframes of the first subset of DL subframes, HARQ ACK/NACK is received by using PUCCH resources in an order of the assigned set of PUCCH resource indices (Step 2150). Finally, for each of the PDSCHs transmitted in the DL subframes of the second subset of DL subframes, HARQ ACK/NACK is received by using PUCCH resources indicated by DCI and/or RRC signaling (Step 2160).

In some embodiments of the present disclosure, the second subset of DL subframes may comprise all the DL subframes indicated by the DL reference TDD configuration other than DL subframes of the first subset of DL subframes.

In some embodiments of the present disclosure, the first subset of DL subframes may comprise one or more virtual subframes that are added by the BS, and the one or more virtual subframes may be used only for assigning PUCCH resource indices, but not for real PDSCH transmissions.

For DL subframes in the first subset of DL subframes, corresponding PUCCH resources may be stacked according to the UL reference TDD configuration and implicitly determined by the first CCE index used for transmission of the corresponding PDCCH.

For DL subframes in the second subset of DL subframes, corresponding PUCCH resource may explicitly signaled, e.g. by DCI and/or RRC signaling.

For example, for DL subframes in the first subset of DL subframes, the corresponding PUCCH resource may be determined by the above equation (2). For the DL subframes in the second subset of DL subframes, the BS may use PUCCH resource index $n_{PUCCH,i}^{(1)}$, where the value of $n_{PUCCH,i}^{(1)}$, is determined according to higher layer configuration and/or the predefined mapping rules as shown in Table 12.

One field in the DCI format of the corresponding PDCCH may be used to determine the PUCCH resource values from one of the four resource values configured by higher layers, with the mapping defined in Table 12.

As a non-limiting example, the field in DCI to indicate PUCCH resource values may be some existing field, e.g. the Transport Power Control (TPC) field. When the existing field is reused, if the DCI is granted or transmitted in the second subset of DL subframes, this field is interpreted as PUCCH resource; and if the DCI is granted or transmitted in the first subset of DL subframes, the field is interpreted according to its original definition.

TABLE 12

PUCCH resource value for HARQ-ACK resource for PUCCH

| Value of "command for PUCCH" | $n_{PUCCH,i}^{(1)}$ |
|---|---|
| '00' | The 1$^{st}$ PUCCH resource index configured by the higher layers |
| '01' | The 2$^{nd}$ PUCCH resource index configured by the higher layers |
| '10' | The 3$^{rd}$ PUCCH resource index configured by the higher layers |
| '11' | The 4$^{th}$ PUCCH resource index configured by the higher layers |

As another non-limiting example, new bits may be added to indicate PUCCH resource values. The new field may be added only on the DCI granted or transmitted in the second subset of DL subframes, and the new field may not be available in the DCI granted or transmitted in the first subset of DL subframes.

As another non-limiting example, if a new field is added to indicate PUCCH resource values, the new field may be interpreted as PUCCH resource for DCI granted or transmitted in the second subset of DL subframes; whereas the field may be used for another purpose than PUCCH resource value indication for DCI granted or transmitted in the first subset of DL subframes.

As a non-limiting example, for all DL transmissions, PUCCH resources may be explicitly signaled by dynamic grant, e.g. DCI, and/or RRC signaling.

In this example, the BS may use PUCCH resource index $n_{PUCCH,i}^{(1)}$, where the value of $n_{PUCCH,i}^{(1)}$ is determined according to higher layer configuration and/or a predefined rule, e.g., a predefined table as shown in Table 12.

One field in the DCI format of the corresponding PDCCH may be used to determine the PUCCH resource values from one of the four resource values configured by higher layers, with the mapping defined in Table 12.

Seventh Embodiment

As the seventh embodiment of the invention, a method used in a BS for receiving HARQ ACK/NACK for PDSCH in dynamic TDD configurations is proposed.

Figure 22:
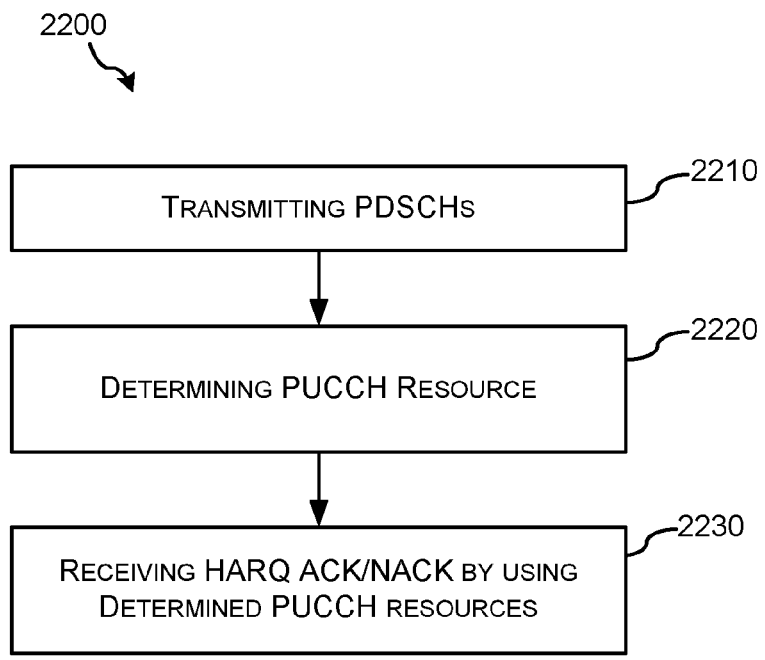
FIG. 22 shows a flowchart of a method used in BS for receiving HARQ ACK/NAK for PDSCH in dynamic TDD configurations according to a seventh embodiment of the present invention.

In the method, referring to FIG. 22 which shows a flowchart of the method 2200, a plurality of PDSCHs are transmitted in DL subframes associated with an UL subframe and indicated by a DL reference TDD configuration (Step 2210). For each of the transmitted PDSCHs, a PUCCH resource is determined based on resources used in transmission of Physical Downlink Control Channels (PDCCHs) corresponding to the PDSCHs transmitted in the corresponding DL subframe (e.g., the sequence number of the first CCE used for transmission of PDCCHs corresponding to the transmitted PDSCH in the corresponding DL subframe) and a start position of the PUCCH resource corresponding to the DL subframe (Step 2220); and then HARQ ACK/NACK is received by using the determined PUCCH resource (Step 2230).

If there is no legacy UEs in the system and all the UEs are new release UEs, i. e. Dynamic-TDD-enabled UEs, we can have different offsets per DL subframe. In this case, an index of PUCCH resource $n_{PUCCH,i}^{(1)}$ in subframe i may be determined as follows:

$$n_{PUCCH,i}^{(1)} = n_{CCE,i} + N_{UE\text{-}PUCCH}^{(i,)}$$

where $n_{CCE,i}$ is the number of the first CCE used for transmission of the corresponding PDCCH in subframe n–$k_i$, $N_{UE\text{-}PUCCH}^{(i)}$ is the offset corresponding to the DL subframe n–$_i$, and $N_{UE\text{-}PUCCH}^{(i)}$ is configured by higher layers.

In the following, an example will be explained in detail by assuming that the UL reference TDD configuration is TDD configuration 0, and the DL reference TDD configuration is TDD configuration 2. In these examples, the subframes #3, #4, #8 and #9 are flexible subframes that can be allocated as UL and DL subframes.

Example 1—TDD Configuration 0 (UL), TDD Configuration 2 (DL)

In this example, for UL subframe 2, the first DL association subset is {SF n-6}, and the second DL association subset is {SF n-8, SF n-7, SF n-4}, as shown in Table 9.

Figure 23:
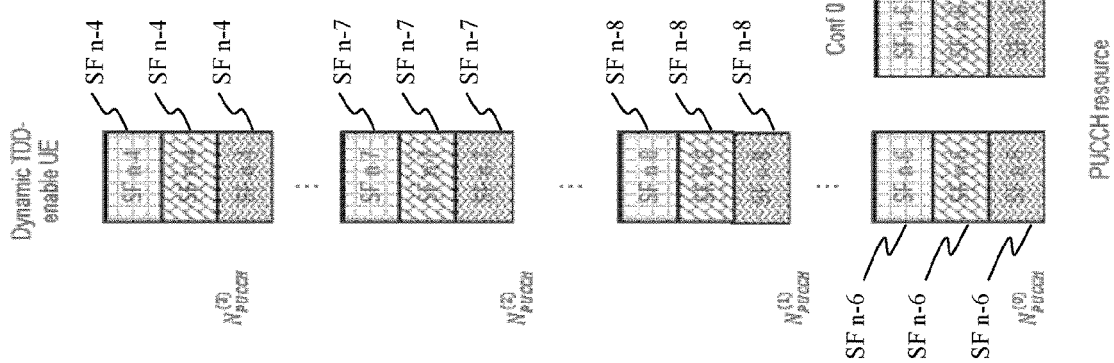
FIG. 23 illustrates an example of how the PUCCH HARQ-ACK resources may be stacked.

FIG. 23 illustrates an example of how the PUCCH HARQ-ACK resources may be stacked. As shown in FIG. 23, PUCCH HARQ-ACK resources for all CCE indices of each DL subframe, i.e., all three one-third CCEs of the DL subframe, are stacked continuously, and each DL subframe corresponds to an offset.

In this example, a start position of a PUCCH resource corresponding to the DL subframe may be separately configured using related information informed by broadcasting, RRC signaling, MAC CE, etc.

Eighth Embodiment

As the eighth embodiment of the invention, a method used in a BS for receiving HARQ ACK/NACK for PDSCH in dynamic TDD configurations is proposed.

Figure 24:
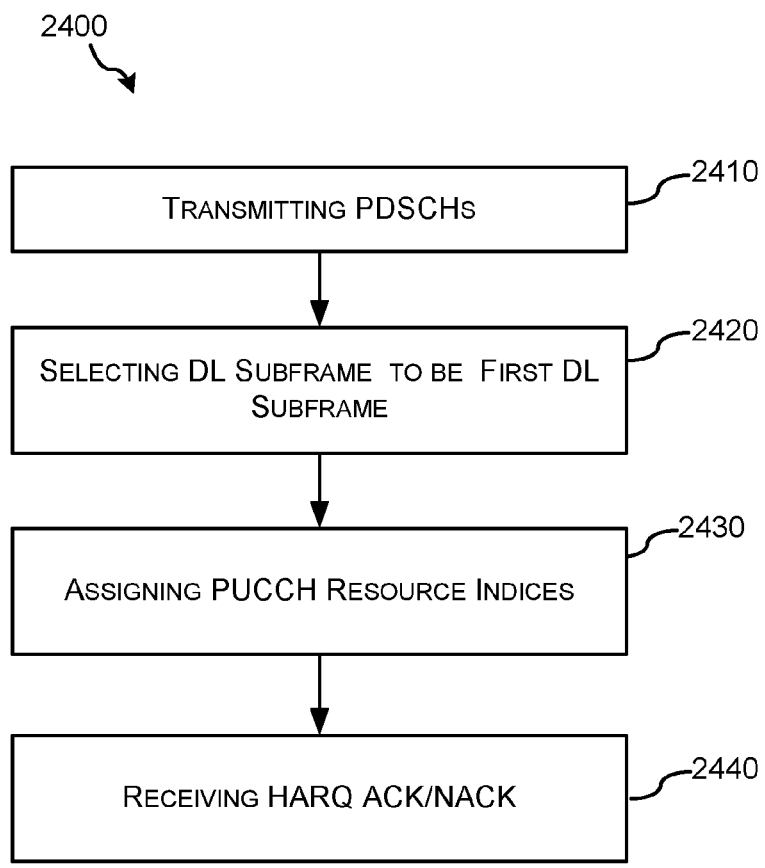
FIG. 24 shows a flowchart of a method used in BS for receiving HARQ ACK/NAK for PDSCH in dynamic TDD configurations according to a eighth embodiment of the present invention.

In the method, referring to FIG. 24 which shows a flowchart of the method 2400, a plurality of PDSCHs are transmitted in DL subframes associated with an UL subframe and indicated by a DL reference TDD configuration (Step 2410). A DL subframe of the DL subframes is selected to be a first DL subframe (Step 2420), so that the sequence number of the selected DL subframe is the same as that of a first DL subframe of DL subframes associated with the UL subframe but indicated by an UL reference TDD configuration. PUCCH resource indices are assigned based on resources used in transmission of PDCCHs corresponding to the PDSCHs transmitted in the DL subframes associated with the UL subframe and indicated by the DL reference TDD configuration (Step 2430). The PUCCH resource indices are assigned in an order starting from the selected first DL subframe of the DL subframes associated with the UL subframe and indicated by the DL reference TDD configuration. For each of the transmitted PDSCHs, HARQ ACK/NACK is received by using PUCCH resources in the order of the assigned PUCCH resource indices (Step 2440).

In this embodiment, the same resource allocation method is used as for the legacy user or UE, but a different order is used for the DL association set for the specific subframe. The new permutation may be indicated by a new look-up table or by rules specified in the standard.

In some examples, the order of the values in the DL association set may be rearranged such that the first values in the DL association set of DL reference TDD configuration match the values in the DL association set for the UL reference/broadcasted TDD configuration for the same subframe, where possible.

In some examples, also other values in the DL association set may be rearranged in order to match the likelihood of the subframes to be used for DL transmissions. For example, subframes related to DL in both the UL and the DL reference TDD configuration may be mapped first. Subframes having different directions in the two configurations could then be mapped in order counting from the UL to DL switching-point in the UL configuration.

Table 13 shows an example DL association set index according to the eighth embodiment.

TABLE 13

Example DL association set index K: $\{k_0^{(q)}, \ldots, k_{M_q-1}^{(q)}\}$ for TDD when UL reference TDD configuration is configuration 0 and DL reference TDD configuration is 2.

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 2 | — | — | 6, 7, 8, 4 8,7,4,6 | — | — | — | — | 6, 7, 8, 4 8,7,4,6 | — | — |

Figure 25:
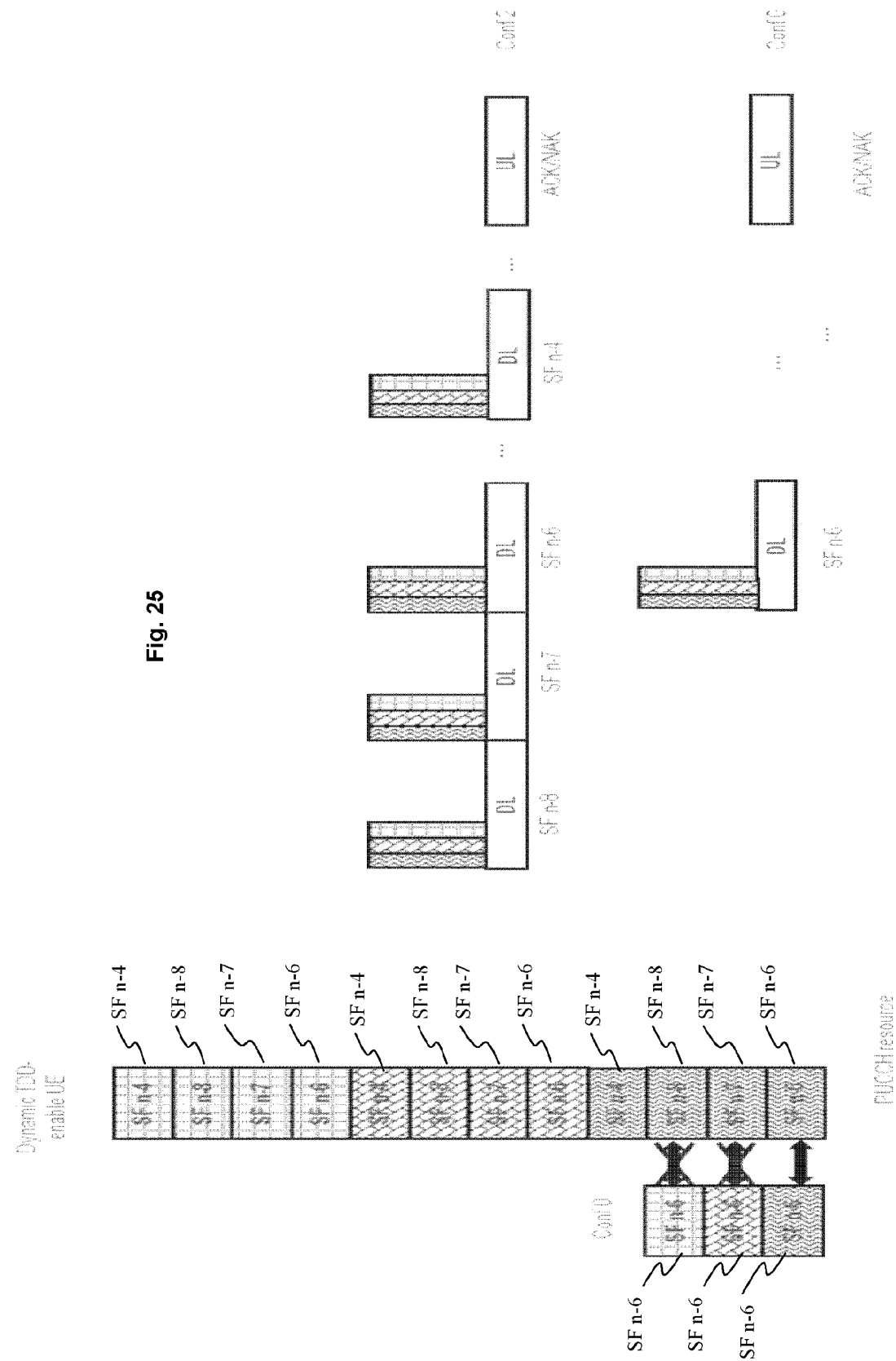
FIG. 25 illustrates an example of how the PUCCH HARQ-ACK resources may be stacked.

As shown in Table 13, DL subframes in the original second DL association set for UL subframe SF n-2, i.e., {SF n-8, SF n-7, SF n-4, SF n-6}, may be rearranged as {SF n-6, SF n-7, SF n-8, SF n-4}, so that PUCCH resources for UE responses to PDSCHs transmitted in the subframe SF n-6 may be stacked firstly. This may be illustrated in FIG. 25.

Figure 26:
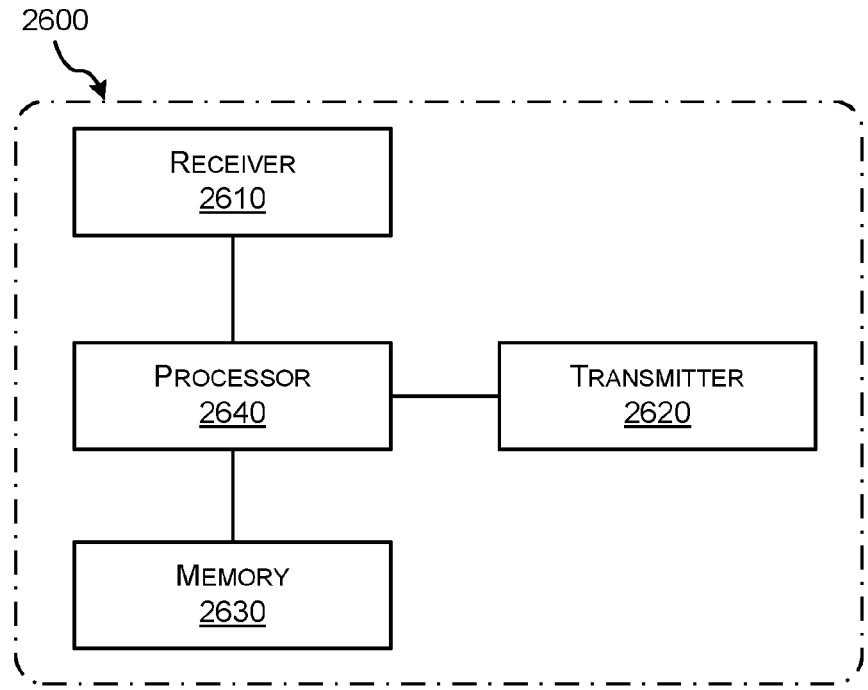
FIG. 26 is a schematic block diagram of BS 2600 according to some embodiments of the present disclosure.

FIG. 26 is a schematic block diagram of a BS 2600 according to some embodiments of the present disclosure.

As shown, BS 2600 includes a receiver 2610, a transmitter 2620, a memory 2630 and a processor 2640. The memory 2630 is configured to store TDD configurations, e.g., TDD configurations 0-6. The processor 2640 is configured to control, e.g., according to instructions stored in the memory 2630, the transmitter 2620 to transmit a plurality of PDSCHs in DL subframes associated with an UL subframe and indicated by a DL reference TDD configuration. The processor 2640 is further configured to divide the DL subframes into a first subset of DL subframes and a second subset of DL subframes. The first subset of DL subframes is also indicated by an UL reference TDD configuration. The processor 2640 is also configured to assign a first set of PUCCH resource indices based on resources used in transmission of PDCCHs corresponding to the PDSCHs transmitted in the DL subframes of the first subset of DL subframes. Moreover, the processor 2640 is configured to assign a second set of PUCCH resource indices based on resources used in transmission of PDCCHs corresponding to the PDSCHs transmitted in the DL subframes of the second subset of DL subframes. The processor 2640 is also configured to control, e.g., according to instructions stored in the memory 2630, the receiver 2610 to, for each of the transmitted PDSCHs, receive HARQ ACK/NACK on PUCCH resources in an order of the assigned first set of PUCCH resource indices for PDSCHs transmitted in the DL subframes of the first subset of DL subframes and in an order of the assigned second set of PUCCH resource indices for PDSCHs transmitted in the DL subframes of the second subset of DL subframes.

For example, the processor 2640 may be configured to assign the first set of PUCCH resource indices and the second set of PUCCH resource indices based on the following formula:

$$n_{PUCCH,i}^{(1)} = (M_q - i - 1) \cdot N_c + i \cdot N_{c+1} + n_{CCE,1} + N_{PUCCH}^{(q)},$$

wherein $n_{PUCCH,i}^{(1)}$ is a PUCCH resource index determined based on resources used in transmission of PDCCHs corresponding to the PDSCHs received in the DL subframe that is the $i$th element of the $q^{th}$ subset, $M_q$ is the total number of DL subframes in the $q^{th}$ subset, $0 \leq i < M_q$, c is selected from {0,1,2,3} such that $N_c \leq n_{CCE,i} < N_{c+1}$, $N_c = \max\{0, \lfloor (N_{RB}^{DL} \cdot (N_{RB}^{DL} \cdot c - 4))/36 \rfloor\}$ where $N_{RB}^{DL}$ is the number of physical resource blocks, PRBs, in each downlink subframe and where $N_{sc}^{RB}$ is the number of subcarriers in each physical resource block, $n_{CCE,i}$ is the sequence number of the first Control Channel Element, CCE, used for transmission of the corresponding PDCCH in subframe $n - k_i^{(q)}$, $k_i^{(q)}$ (q=0,1) is the $i^{th}$ element of the $q^{th}$ subset, n indicates the UL subframe associated with the DL subframes where the plurality of PDSCHs are received, $N_{PUCCH}^{(q)}$ (q=0,1) is an offset for $q^{th}$ subset, wherein q=0 corresponds to one of the first and second subsets of DL subframes and q=1 corresponds to the other one of the first and second subsets of DL subframes.

As above, there may be an offset between the first set of PUCCH resource indices and the second set of PUCCH resource indices.

As above, the offset may be configured by higher layers or predefined.

As above, the second subset of DL subframes may comprise all the DL subframes indicated by the DL reference TDD configuration other than DL subframes of the first subset of DL subframes.

The processor 2640 may further be configured to add one or more virtual subframes to the first subset of DL subframes. The one or more virtual subframes may be used for assigning PUCCH resource indices, but not for real PDSCH transmissions.

Figure 27:
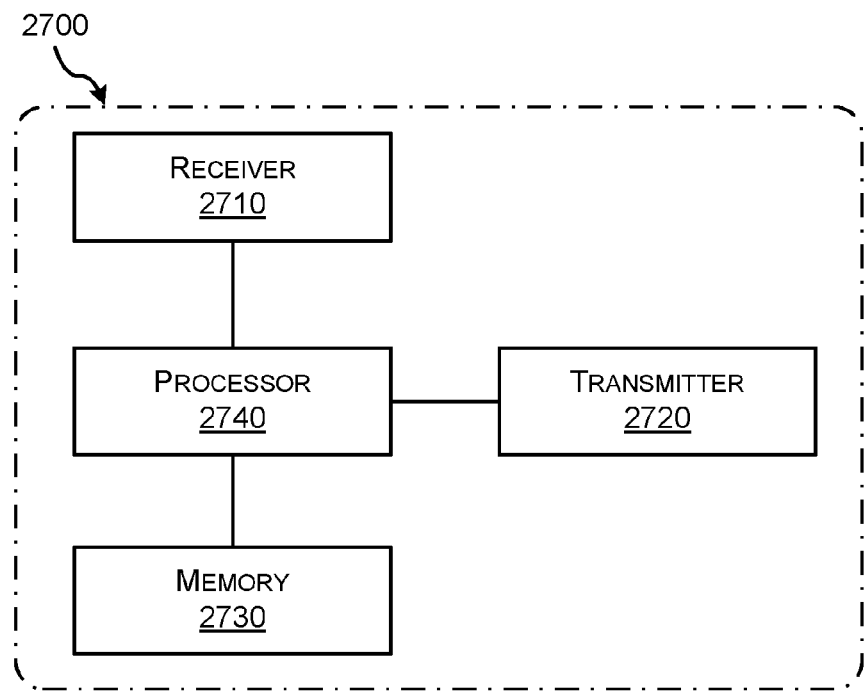
FIG. 27 is a schematic block diagram of BS 2700 according to some embodiments of the present disclosure.

FIG. 27 is a schematic block diagram of a BS 2700 according to some embodiments of the present disclosure.

As shown, BS 2700 includes a receiver 2710, a transmitter 2720, a memory 2730 and a processor 2740. The memory 2730 is configured to store TDD configurations, e.g., TDD configurations 0-6. The processor 2740 is configured to control, e.g., according to instructions stored in the memory 2730, the transmitter 2720 to transmit a plurality of PDSCHs in DL subframes associated with an UL subframe and indicated by a DL reference TDD configuration. The processor 2740 is also configured to control, e.g., according to instructions stored in the memory 2730, the receiver 2710 to, for each of the transmitted PDSCHs, receive HARQ ACK/NACK at least partially on PUCCH resources indicated by DCI and/or RRC signaling.

Alternatively or additionally, the processor 2740 may be configured to divide the DL subframes into a first subset of DL subframes and a second subset of DL subframes. The first subset of DL subframes is according to this example also indicated by an UL reference TDD configuration. The processor 2740 may further be configured to assign a set of PUCCH resource indices based on resources used in transmission of PDCCHs corresponding to the PDSCHs transmitted in the DL subframes of the first subset of DL subframes. In this case, the processor 2740 may also be configured to control, e.g., according to instructions stored in the memory 2730, the receiver 2710 to, for each of the PDSCHs transmitted in the DL subframe of the first subset of DL subframes, receive HARQ ACK/NACK on PUCCH resources in an order of the assigned set of PUCCH resource indices. Finally, the processor 2740 may be configured to control, e.g., according to instructions stored in the memory 2730, the receiver 2710 to, for each of the PDSCHs received in the DL subframes of the second subset of DL subframes, receive HARQ ACK/NACK on PUCCH resources indicated by DCI and/or RRC signaling.

As above, the second subset of DL subframes may comprise all the DL subframes indicated by the DL reference TDD configuration other than DL subframes of the first subset of DL subframes.

The processor 2740 may further be configured to add one or more virtual subframes to the first subset of DL subframes. The one or more virtual subframes may be used for assigning PUCCH resource indices, but not for real PDSCH transmissions.

Figure 28:
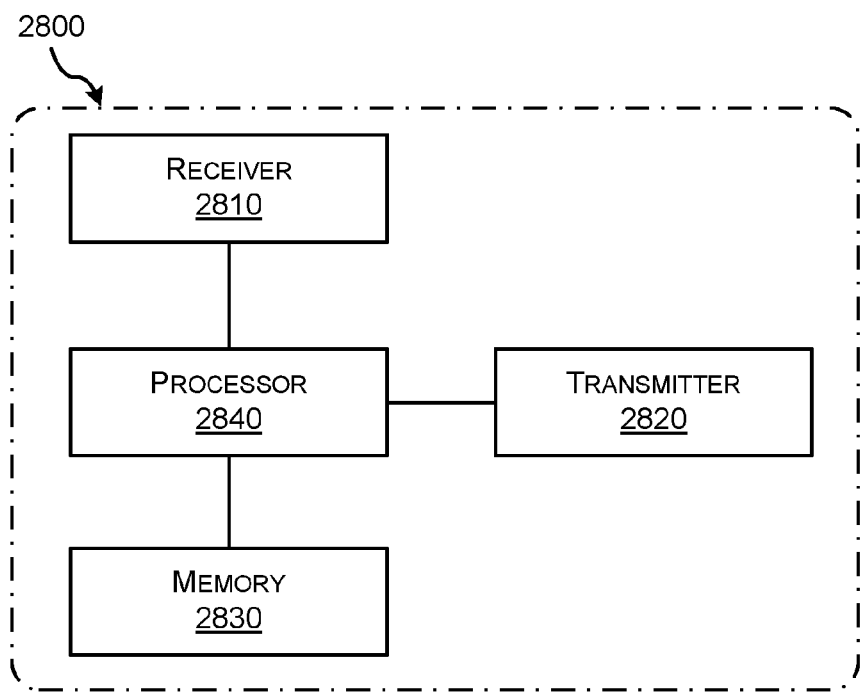
FIG. 28 is a schematic block diagram of BS 2800 according to some embodiments of the present disclosure.

FIG. 28 is a schematic block diagram of a BS 2800 according to some embodiments of the present disclosure.

As shown, BS 2800 includes a receiver 2810, a transmitter 2820, a memory 2830 and a processor 2840. The memory 2830 is configured to store TDD configurations, e.g., TDD configurations 0-6. The processor 2840 is configured to control, e.g., according to instructions stored in the memory 2830, the transmitter 2820 to transmit a plurality of PDSCHs in DL subframes associated with an UL subframe and indicated by a DL reference TDD configuration. The processor 2840 is further configured to determine, for each of the transmitted PDSCHs, a PUCCH resource based on resources used in transmission of PDCCHs corresponding to the PDSCHs transmitted in the corresponding DL subframe (e.g., the sequence number of the first CCE used for transmission of PDCCHs corresponding to the transmitted PDSCH in the corresponding DL subframe) and a start position of the PUCCH resource corresponding to the DL subframe. The processor 2840 is also configured to control, e.g., according to instructions stored in the memory 2830, the receiver 2810 to, for each of the transmitted PDSCHs, receive HARQ ACK/NACK on the determined PUCCH resource.

As above, the start position may be configured by higher layers or predefined.

As above, the start position may be configured using related information informed by broadcasting, RRC signaling, or MAC CE.

Figure 29:
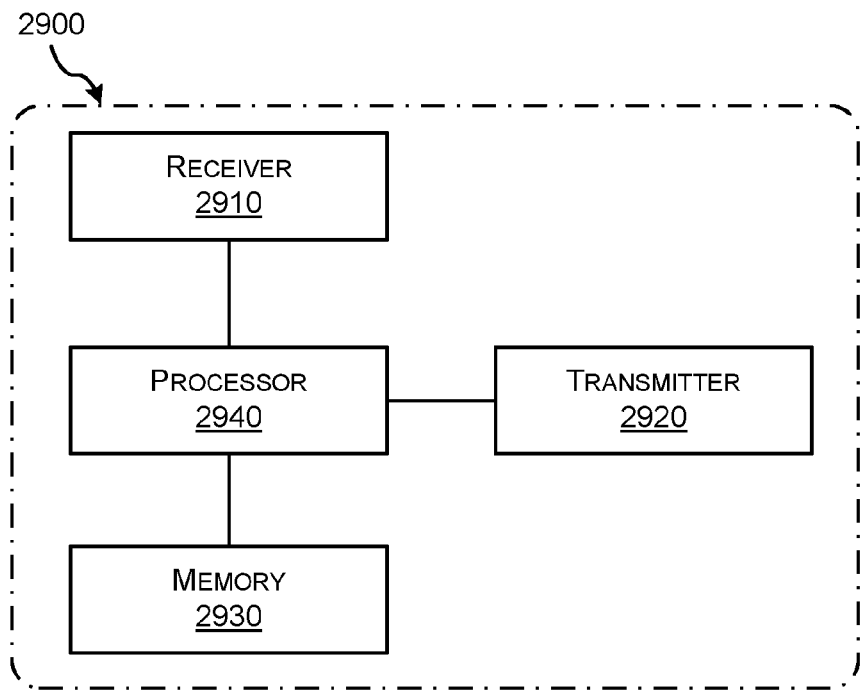
FIG. 29 is a schematic block diagram of BS 2900 according to some embodiments of the present disclosure.

FIG. 29 is a schematic block diagram of a BS 2900 according to some embodiments of the present disclosure.

As shown, BS 2900 includes a receiver 2910, a transmitter 2920, a memory 2930 and a processor 2940. The memory 2930 is configured to store TDD configurations, e.g., TDD configurations 0-6. The processor 2940 is configured to control, e.g., according to instructions stored in the memory 2930, the transmitter 2920 to transmit a plurality of PDSCHs in DL subframes associated with an UL subframe and indicated by a DL reference TDD configuration. The processor 2940 is further configured to select a DL subframe of the DL subframes to be a first DL subframe. The sequence number of the selected DL subframe is the same as that of a first DL subframe of DL subframes associated with the UL subframe but indicated by an UL reference TDD configuration. The processor 2940 is further configured to assign PUCCH resource indices based on resources used in transmission of PDCCHs corresponding to the PDSCHs transmitted in the DL subframes associated with the UL subframe and indicated by the DL reference TDD configuration. The PUCCH resource indices are assigned in an order starting from the selected first DL subframe of the DL subframes associated with the UL subframe and indicated by the DL reference TDD configuration. The processor 2940 is further configured to control, e.g., according to instructions stored in the memory 2930, the receiver 2910 to, for each of the transmitted PDSCHs, receive HARQ ACK/NACK on PUCCH resources in the order of the assigned PUCCH resource indices.

As described in the above embodiments, the PUCCH HARQ-ACK resource conflict problem caused by dynamic TDD configuration is solved, while efficiently compressing PUCCH HARQ-ACK resource to improve the resource utilization efficiency.

Although the present technology has been described above with reference to specific embodiments, it is not intended to be limited to the specific form set forth herein. For example, the embodiments presented here are not limited to scenarios with PDCCH; rather they are equally applicable to other scenarios with e.g., ePDCCH (Enhanced PDCCH). For example, the embodiments presented herein are not limited to the existing TDD configuration; rather they are equally applicable to new TDD configurations defined in future. For example, the embodiments presented herein are noted limited to the eNB; rather they are equally applicable to various types of base stations. The technology is limited only by the accompanying claims and other embodiments than the specific ones described above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

What is claimed is:

1. A method used in a User Equipment, UE, for reporting Hybrid Automatic Repeat Request, HARQ, acknowledgement, ACK, /non-acknowledgement, NACK, for Physical Downlink Shared Channels, PDSCHs, in dynamic time division duplex, TDD, configurations, the method comprising:

receiving a plurality of PDSCHs in DownLink, DL, subframes associated with an UpLink, UL, subframe and indicated by a DL reference TDD configuration;

dividing the DL subframes into a first subset of DL subframes and a second subset of DL subframes, wherein the first subset of DL subframes is also indicated by an UL reference TDD configuration;

assigning a first set of Physical Uplink Control Channel, PUCCH, resource indices based on resources used in transmission of Physical Downlink Control Channels, PDCCHs, corresponding to the PDSCHs received in the DL subframes of the first subset of DL subframes;

assigning a second set of PUCCH resource indices based on resources used in transmission of PDCCHs corresponding to the PDSCHs received in the DL subframes of the second subset of DL subframes; and for each of the received PDSCHs, reporting HARQ ACK/NACK using PUCCH resources in an order of the assigned first set of PUCCH resource indices for PDSCHs received in the DL subframes of the first subset of DL subframes and in an order of the assigned second set of PUCCH resource indices for PDSCHs received in the DL subframes of the second subset of DL subframes, characterized in that assigning the first set of PUCCH resource indices and the second set of PUCCH resource indices are based on the following formula:

$$n_{PUCCH,i}^{(1)} = (M_q - i - 1) \cdot N_c + i \cdot N_{c+1} + n_{CCE,i} + N_{PUCCH}^{(q)},$$

wherein $n_{PUCCH,i}^{(1)}$ is a PUCCH resource index determined based on resources used in transmission of PDCCHs corresponding to the PDSCHs received in the DL subframe that is the $i^{th}$ element of the $q^{th}$ subset, $M_q$ is the total number of DL subframes in the $q^{th}$ subset, $0 \le i < M_q$, c is selected from $\{0,1,2,3\}$, such that $N_c \le n_{CCE,i} < N_{c+1}$, $N_c = \max\{0, \lfloor [N_{RB}^{DL} \cdot (N_{sc}^{RB} \cdot c - 4)]/36 \rfloor\}$ where $N_{RB}^{DL}$ is the number of physical resource blocks, PRBs, in each downlink subframe and where $N_{sc}^{RB}$ is the number of subcarriers in each physical resource block, $n_{CCE,i}$ is the sequence number of the first Control Channel Element, CCE, used for transmission of the corresponding PDCCH in subframe $n - k_i^{(q)}$, $k_i^{(q)}(q=0,1)$ is the $i^{th}$ element of the $q^{th}$ subset, a indicates the UL subframe associated with the DL subframes where the plurality of PDSCHs are received, $N_{PUCCH}^{(q)}(q=0,1)$ is an offset for $q^{th}$ subset, wherein $q=0$ corresponds to one of the first and second subsets of DL subframes and $q=1$ corresponds to the other one of the first and second subsets of DL subframes.

2. The method according to claim 1, wherein the second subset of DL subframes comprises all the DL subframes indicated by the DL reference TDD configuration other than DL subframes of the first subset of DL subframes.

3. The method according to claim 1, wherein the first subset of DL subframes comprises one or more virtual subframes that are added by the UE, wherein the one or more virtual subframes are used for assigning PUCCH resource indices, but not for real PDSCH transmissions.

4. A User Equipment, UE, for reporting Hybrid Automatic Repeat Request, HARQ, acknowledgement, ACK, /non-acknowledgement, NACK, for Physical Downlink Shared Channels, PDSCHs, in dynamic, time division duplex, TDD, configurations, the UE comprising a receiver, a transmitter, a memory and a processor,
wherein
the memory is configured to store TDD configurations;
the processor is configured to control the receiver to receive a plurality of PDSCHs in Downlink, DL, subframes associated with an UpLink, UL, subframe and indicated by a DL reference TDD configuration;
the processor (is configured to divide the DL subframes into a first subset of DL subframes and a second subset of DL subframes, wherein the first subset of DL subframes is also indicated by an UL reference TDD configuration;
the processor is configured to assign a first set of Physical Uplink Control Channel, PUCCH, resource indices based on resources used in transmission of Physical Downlink Control Channels, PDCCHs, corresponding to the PDSCHs received in the DL subframes of the first subset of DL subframes;
the processor is configured to assign a second set of PUCCH resource indices based on resources used in transmission of PDCCHs corresponding to the PDSCHs received in the DL subframes of the second subset of DL subframes; and
the processor is configured to control the transmitter to, for each of the received PDSCHs, report HARQ ACK/NACK using PUCCH resources in an order of the assigned first set of PUCCH resource indices for PDSCHs received in the DL subframes of the first subset of DL subframes and in an order of the assigned second set of PUCCH resource indices for PDSCHs received in the DL subframes of the second subset of DL subframes, characterized in that the processor is configured to assign the first set of PUCCH resource indices and the second set of PUCCH resource indices based on the following formula:

$$n_{PUCCH,i}^{(1)} = (M_q - i - 1) \cdot N_c + i \cdot N_{c+1} + n_{CCE,i} + N_{PUCCH}^{(q)},$$

wherein $n_{PUCCH,i}^{(1)}$ is a PUCCH resource index determined based on resources used in transmission of PDCCHs corresponding to the PDSCHs received in the DL subframe that is the $i^{th}$ element of the $q^{th}$ subset, $M_q$ is the total number of DL subframes in the $q^{th}$ subset, $0 \leq i < M_q$, c is selected from $\{0,1,2,3\}$ such that $N_c \leq n_{CCE,i} < N_{c+1}$, $N_c = \max\{0, \lfloor [N_{RB}^{DL} \cdot (N_{sc}^{RB} \cdot c - 4)]/36 \rfloor\}$ where $N_{RB}^{DL}$ is the number of physical resource blocks, PRBs, in each downlink subframe and where $N_{sc}^{RB}$ is the number of subcarriers in each physical resource block, $n_{CCE,i}$ is the sequence number of the first Control Channel Element, CCE, used for transmission of the corresponding PDCCH in subframe $n - k_i^{(q)}$, $k_i^{(q)}(q=0,1)$ is the $i^{th}$ element of the $q^{th}$ subset, n indicates the UL subframe associated with the DL subframes where the plurality of PDSCHs are received, $N_{PUCCH}^{(q)}(q=0,1)$ is an offset for $q^{th}$ subset, wherein $q=0$ corresponds to one of the first and second subsets of DL subframes and $q=1$ corresponds to the other one of the first and second subsets of DL subframes.

5. The UE according to claim 4, wherein the second subset of DL subframes comprises all the DL subframes indicated by the DL reference TDD configuration other than DL subframes of the first subset of DL subframes.

6. The UE according to claim 4, wherein the processor is further configured to add one or more virtual subframes to the first subset of DL subframes, wherein the one or more virtual subframes are used for assigning PUCCH resource indices, but not for real PDSCH transmissions.

7. A method used in a Base Station, BS, for receiving Hybrid Automatic Repeat Request, HARQ, acknowledgement, ACK, /non-acknowledgement, HACK, for Physical Downlink Shared Channels, PDSCHs, in dynamic time division duplex, TDD, configurations, the method comprising:
transmitting a plurality of PDSCHs in DownLink, DL, subframes associated with an UpLink, UL, subframe and indicated by a DL reference TDD configuration;
dividing the DL subframes into a first subset of DL subframes and a second subset of DL subframes, wherein the first subset of DL subframes is also indicated by an UL reference TDD configuration;
assigning a first set of Physical Uplink Control Channel, PUCCH, resource indices based on resources used in transmission of Physical Downlink Control Channels, PDCCHs, corresponding to the PDSCHs transmitted in the DL subframes of the first subset of DL subframes;
assigning a second set of PUCCH resource indices based on resources used in transmission of PDCCHs corresponding to the PDSCHs transmitted in the DL subframes of the second subset of DL subframes; and
for each of the transmitted PDSCHs, receiving HARQ ACK/NACK on PUCCH resources in an order of the assigned first set of PUCCH resource indices for PDSCHs transmitted in the DL subframes of the first subset of DL subframes and in an order of the assigned second set of PUCCH resource indices for PDSCHs transmitted in the DL subframes of the second subset of DL subframes, characterized in that assigning the first set of PUCCH resource indices and the second set of PUCCH resource indices are based on the following formula:

$$n_{PUCCH,i}^{(1)} = (M_q - i - 1) \cdot N_c + i \cdot N_{c+1} + n_{CCE,i} + N_{PUCCH}^{(q)},$$

wherein $n_{PUCCH,i}^{(1)}$ is a PUCCH resource index determined based on resources used in transmission of PDCCHs corresponding to the PDSCHs received in the DL subframe that is the $i^{th}$ element of the $q^{th}$ subset, $M_q$ is the total number of DL subframes in the $q^{th}$ subset, $0 \leq i < M_q$, c is selected from $\{0,1,2,3\}$ such that $N_c \leq n_{CCE,i} < N_{c+1}$, $N_c = \max\{0, \lfloor [N_{RB}^{DL} \cdot (N_{sc}^{RB} \cdot c - 4)]/36 \rfloor\}$ where $N_{RB}^{DL}$ is the number of physical resource blocks, PRBs, in each downlink subframe and where $N_{sc}^{RB}$ is the number of subcarriers in each physical resource block, $n_{CCE,i}$ is the sequence number of the first Control Channel Element, CCE, used for transmission of the corresponding PDCCH In subframe $n - k_i^{(q)}$, $k_i^{(q)}(q=0,1)$ is the $i^{th}$ element of the $q^{th}$ subset, n indicates the UL subframe associated with the DL subframes where the plurality of PDSCHs are received, $N_{PUCCH}^{(q)}(q=0,1)$ is an offset for $q^{th}$ subset, wherein $q=0$ corresponds to one of the first and second subsets of DL subframes and $q=1$ corresponds to the other one of the first and second subsets of DL subframes.

8. The method according to claim 7, wherein the second subset of DL subframes comprises all the DL subframes indicated by the DL reference TDD configuration other than DL subframes of the first subset of DL subframes.

9. The method according to claim 7, wherein the first subset of DL subframes comprises one or more virtual subframes that are added by the BS, wherein the one or more virtual subframes are used for assigning PUCCH resource indices, but not for real PDSCH transmissions.

10. A Base Station, BS, for receiving Hybrid Automatic Repeat Request, HARQ, acknowledgement, ACK, /non-acknowledgement, NACK, for Physical Downlink Shared Channels, PDSCHs, in dynamic time division duplex, TDD, configurations, the BS comprising a receiver, a transmitter, a memory and a processor, wherein the memory is configured to store TDD configurations;

the processor is configured to control the transmitter to transmit a plurality of PDSCHs in DownLink, DL, subframes associated with an UpLink, UL, subframe and indicated by a DL reference TDD configuration;

the processor is configured to divide the DL, subframes into a first subset of DL subframes and a second subset of DL subframes, wherein the first subset of DL subframes is also indicated by an UL reference TDD configuration;

the processor is configured to assign a first set of Physical Uplink Control Channel, PUCCH, resource indices based on resources used in transmission of Physical Downlink Control Channels, PDCCHs, corresponding to the PDSCHs transmitted in the DL subframes of the first subset of DL subframes;

the processor is configured to assign a second set of PUCCH resource indices based on resources used in transmission of PDCCHs corresponding to the PDSCHs transmitted in the DL subframes of the second subset of DL subframes; and the processor is configured to control the receiver to, for each of the transmitted PDSCHs, receive HARQ ACK/NACK on PUCCH resources in an order of the assigned first set of PUCCH resource indices for PDSCHs transmitted in the DL subframes of the first subset of DL, subframes and in an order of the assigned second set of PUCCH resource indices for PDSCHs transmitted in the DL subframes of the second subset of DL subframes, characterized in that the processor is configured to assign the first set of PUCCH resource indices and the second set of PUCCH resource indices based on the following formula:

$$n_{PUCCH,i}^{(1)} = (M_q - i - 1) \cdot N_c + i \cdot N_{c+1} + n_{CCE,i} + N_{PUCCH}^{(q)},$$

wherein $n_{PUCCH,i}^{(1)}$ is a PUCCH resource index determined based on resources used in transmission of PDCCHs corresponding the PDSCHs received in the DL subframe that is the $i^{th}$ element of the $q^{th}$ subset, $M_q$ is the total number of DL subframes in the $q^{th}$ subset, $0 \leq i < M_q$, is selected from $\{0,1,2,3\}$ such that $N_c \leq n_{CCE,i} < N_{c+1}$, $N_c = \max\{0, \lfloor [N_{RB}^{DL} \cdot (N_{sc}^{RB} \cdot c - 4)]/36 \rfloor\}$ where $N_{RB}^{DL}$ is the number of physical resource blocks, PRBs, in each downlink subframe and where $N_{sc}^{RB}$ is the number of subcarriers in each physical resource block, $n_{CCE,i}$ is the sequence number of the first Control Channel Element, CCE, used for transmission of the corresponding PDCCH ire subframe $n - k_i^{(q)}$, $k_i^{(q)}(q=0,1)$ is the $i^{th}$ element of the $q^{th}$ subset, n indicates the UL subframe associated with the DL subframes where the plurality of PDSCHs are received, $N_{PUCCH}^{(q)}(q=0,1)$ is an offset for $q^{th}$ subset, wherein q=0 corresponds to one of the first and second subsets of DL subframes and q=1 corresponds to the other one of the first and second subsets of DL subframes.

11. The BS according to claim 10, wherein the second subset of DL subframes comprises all the DL subframes indicated by the DL reference TDD configuration other than DL subframes of the first subset of DL subframes.

12. The BS according to claim 10, wherein the processor (is further configured to add one or more virtual subframes to the first subset of DL subframes, wherein the one or more virtual subframes are used for assigning PUCCH resource indices, but not for real PDSCH transmissions.

* * * * *

UNITED STATES PATENT AND TRADEMARK OFFICE
CERTIFICATE OF CORRECTION

PATENT NO. : 10,135,581 B2
APPLICATION NO. : 15/488638
DATED : November 20, 2018
INVENTOR(S) : Li et al.

It is certified that error appears in the above-identified patent and that said Letters Patent is hereby corrected as shown below:

On the Title Page

Item (56), Column 2, Line 2, delete "PCT/SE2014/050423; ," and insert -- PCT/SE2014/050423; --, therefor.

In the Drawings

Fig. 1, Drawing Sheet 1 of 25, delete "Fig. 1" and insert -- Fig. 1 (Prior Art) --, therefor.

Figure 2:
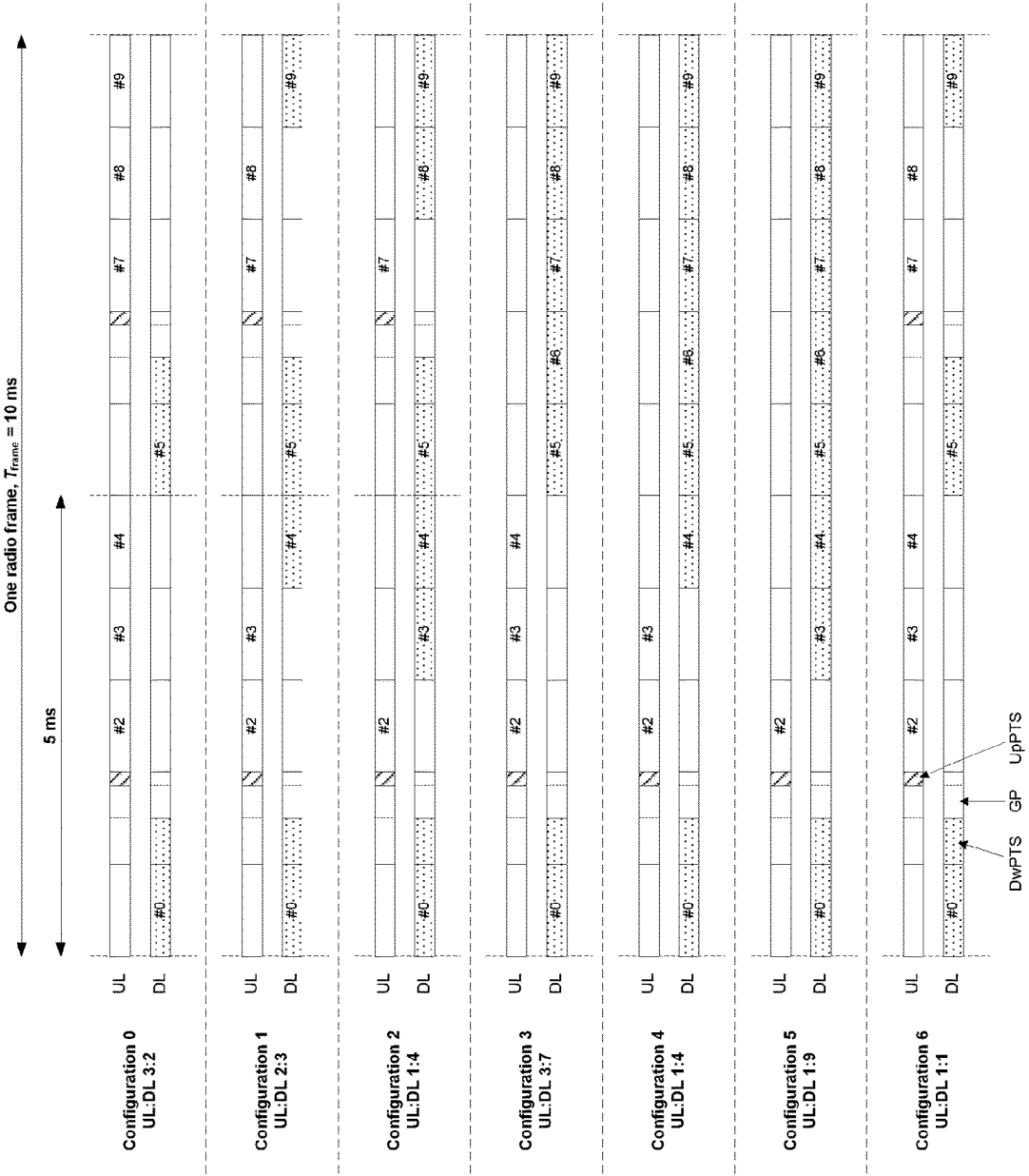
FIG. 2 is a diagram illustrating an example of seven different downlink/uplink configurations for LTE TDD.

Fig. 2, Drawing Sheet 2 of 25, delete "Fig. 2" and insert -- Fig. 2 (Prior Art) --, therefor.

In the Specification

Column 1, Line 11, delete "Configurations"," and insert -- Configurations", now Pat. No. 9,642,124, --, therefor.

Column 15, Line 50, delete "can seen" and insert -- can be seen --, therefor.

Column 17, Line 2, delete "subframes;" and insert -- subframes. --, therefor.

Column 21, Line 3, delete "Transport Power Control (TPC)" and insert -- Transmit Power Control (TPC) --, therefor.

Column 24, Line 8, delete "$n_{PUCCH,i}^{(1)}=(M_q-i-1)\cdot N_c i \cdot N_{c+1}+n_{CCE,i}+N_{PUCCH}^{(q)}$." and insert $$n_{PUCCH,j}^{(1)} = (M_q - i - 1) \cdot N_c + i \cdot N_{c+1} + n_{CCE,i} + N_{PUCCH}^{(q)}$$

-- , therefor.

Column 26, Line 60, delete "$n_{PUCCH,i}^{(1)}=(M_q-i-1)\cdot N_c \cdot N_{c+1}+n_{CCE,i}+N_{PUCCH}^{(q)}$," and insert Signed and Sealed this
Second Day of June, 2020

Andrei Iancu
*Director of the United States Patent and Trademark Office*

CERTIFICATE OF CORRECTION (continued)
U.S. Pat. No. 10,135,581 B2

$$n^{(1)}_{\text{PUCCH},j} = \left(M_q - i - 1\right) \cdot N_c + i \cdot N_{c+1} + n_{\text{CCE},j} + N^{(q)}_{\text{PUCCH}},$$

--, therefor.

Column 30, Line 44, delete "Transport Power Control (TPC)" and insert -- Transmit Power Control (TPC) --, therefor.

In the Claims

Column 36, Line 58, Claim 1, delete "a indicates" and insert -- n indicates --, therefor.

Column 37, Line 9, Claim 4, delete "dynamic, time" and insert -- dynamic time --, therefor.

Column 37, Line 18, Claim 4, delete "processor (is" and insert -- processor is --, therefor.

Column 37, Line 53, Claim 4, delete "cis" and insert -- c is --, therefor.

Column 38, Line 12, Claim 7, delete "HACK," and insert -- NACK, --, therefor.

Column 38, Line 58, Claim 7, delete "PDCCH In" and insert -- PDCCH in --, therefor.

Column 39, Line 20, Claim 10, delete "DL, subframes" and insert -- DL subframes --, therefor.

Column 40, Line 2, Claim 10, delete "DL, subframes" and insert -- DL subframes --, therefor.

Column 40, Lines 13-14, Claim 10, delete "corresponding the" and insert -- corresponding to the --, therefor.

Column 40, Line 16, Claim 10, delete "0≤i<$M_q$, is" and insert -- 0≤i<$M_q$, c is --, therefor.

Column 40, Line 23, Claim 10, delete "PDCCH ire" and insert -- PDCCH in --, therefor.

Column 40, Lines 34-35, Claim 12, delete "processor (is" and insert -- processor is --, therefor.